US011949896B2

(12) United States Patent
Li et al.

(10) Patent No.: US 11,949,896 B2
(45) Date of Patent: *Apr. 2, 2024

(54) CHROMA QUAD TREE SPLIT CONSTRAINT

(71) Applicant: Tencent America LLC, Palo Alto, CA (US)

(72) Inventors: Guichun Li, San Jose, CA (US); Xiang Li, Saratoga, CA (US); Shan Liu, San Jose, CA (US); Xiaozhong Xu, State College, PA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/878,683

(22) Filed: Aug. 1, 2022

(65) Prior Publication Data
US 2022/0368933 A1 Nov. 17, 2022

Related U.S. Application Data

(63) Continuation of application No. 17/060,652, filed on Oct. 1, 2020, now Pat. No. 11,445,208.
(Continued)

(51) Int. Cl.
*H04N 19/44* (2014.01)
*H04N 19/119* (2014.01)
(Continued)

(52) U.S. Cl.
CPC .......... *H04N 19/44* (2014.11); *H04N 19/119* (2014.11); *H04N 19/132* (2014.11);
(Continued)

(58) Field of Classification Search
CPC .... H04N 19/44; H04N 19/119; H04N 19/132; H04N 19/176; H04N 19/186; H04N 19/70; H04N 19/96
See application file for complete search history.

(56) References Cited

U.S. PATENT DOCUMENTS

2017/0208336 A1* 7/2017 Li .................... H04N 19/60
2018/0199062 A1* 7/2018 Zhang ............... H04N 19/59
(Continued)

FOREIGN PATENT DOCUMENTS

WO   2016074567 A1   5/2016
WO   2019230670 A1   12/2019
(Continued)

OTHER PUBLICATIONS

Japanese Office Action issued in Application No. 2021-557673 dated Nov. 1, 2022 with English Translation, 14 pages.
(Continued)

*Primary Examiner* — Richard A Hansell, Jr.
(74) *Attorney, Agent, or Firm* — ARENTFOX SCHIFF LLP

(57) ABSTRACT

Aspects of the disclosure provide a method and an apparatus for video encoding. Whether a block size cbSize of a chroma block in luma samples is less than or equal to a minimum allowed chroma quaternary tree (QT) leaf node size MinQtSizeC in luma samples such that cbSize <=MinQtSizeC is determined. In response to the block size cbSize of the chroma block in luma samples being less than or equal to the minimum allowed chroma QT leaf node size MinQtSizeC in luma samples, a QT split is determined as disallowed for the chroma block. Partition information indicating that a chroma coding tree structure in a dual tree is applied to the chroma block is generated, the partition information further indicating the block size cbSize of the chroma block in luma samples and the minimum allowed chroma QT leaf node size MinQtSizeC in luma samples.

20 Claims, 29 Drawing Sheets

Related U.S. Application Data

(60) Provisional application No. 62/959,904, filed on Jan. 11, 2020, provisional application No. 62/953,034, filed on Dec. 23, 2019.

(51) Int. Cl.
*H04N 19/132* (2014.01)
*H04N 19/176* (2014.01)
*H04N 19/186* (2014.01)
*H04N 19/70* (2014.01)
*H04N 19/96* (2014.01)

(52) U.S. Cl.
CPC ......... *H04N 19/176* (2014.11); *H04N 19/186* (2014.11); *H04N 19/70* (2014.11); *H04N 19/96* (2014.11)

(56) References Cited

U.S. PATENT DOCUMENTS

| | | | |
|---|---|---|---|
| 2018/0199072 A1* | 7/2018 | Li | H04N 19/186 |
| 2018/0278942 A1* | 9/2018 | Zhang | H04N 19/139 |
| 2018/0367818 A1* | 12/2018 | Liu | H04N 19/124 |
| 2019/0246143 A1* | 8/2019 | Zhang | H04N 19/132 |
| 2021/0112247 A1* | 4/2021 | Hsiang | H04N 19/96 |
| 2021/0120231 A1* | 4/2021 | Yoo | H04N 19/61 |
| 2021/0185321 A1* | 6/2021 | Liao | H04N 19/119 |

FOREIGN PATENT DOCUMENTS

| | | | | |
|---|---|---|---|---|
| WO | 2021043157 A1 | 3/2021 | | |
| WO | WO-2021043157 A1 * | 3/2021 | ........... | H04N 19/109 |

OTHER PUBLICATIONS

Benjamin Bross et al., "Versatile Video Coding (Draft 7)", Joint Video Experts Team (JVET), Nov. 14, 2019, [JVET-P2001-vE] (version 14), pp. 25, 99-101.

Benjamin Bross et al., "Versatile Video Coding (Draft 3)", Joint Video Experts Team (JVET), Jan. 8, 2019, [JVET-L1001-v9] (version 13), p. 65.

Jianle Chen et al., "Algorithm description for Versatile Video Coding and Test Model 6 (VTM 6)", Joint Video Experts Team (JVET) of ITU-T SG 16 WP 3 and ISO/IEC JTC 1 /SC 29/WG11, JVET-O2002-v2, 15th Meeting: Gothenburg, SE, Jul. 3-12, 2019 (87 pages).

Benjamin Bross et al., "Versatile Video Coding (Draft 7)", Joint Video Experts Team (JVET) of ITU-T SG 16 WP 3 and ISO/IEC JTC 1 /SC 29/WG11, JVET-P2001-vA, 16th Meeting: Geneva, CH, Oct. 1-11, 2019 (486 pages).

International Telecommunication Union (ITU-T) Telecommunication Standardization Sector of ITU, "High Efficiency Video Coding", Series H: Audiovisual and Multimedia Systems Infrastructure of Audiovisual Services—Coding of Moving Video, Dec. 2016 (664 pages).

International Search Report and Written Opinion issued in International Application No. PCT/US 20/53818 dated Feb. 4, 2021. 10 pages.

* cited by examiner

Table 1: Examples of chroma subsampling formats

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

*FIG. 9*

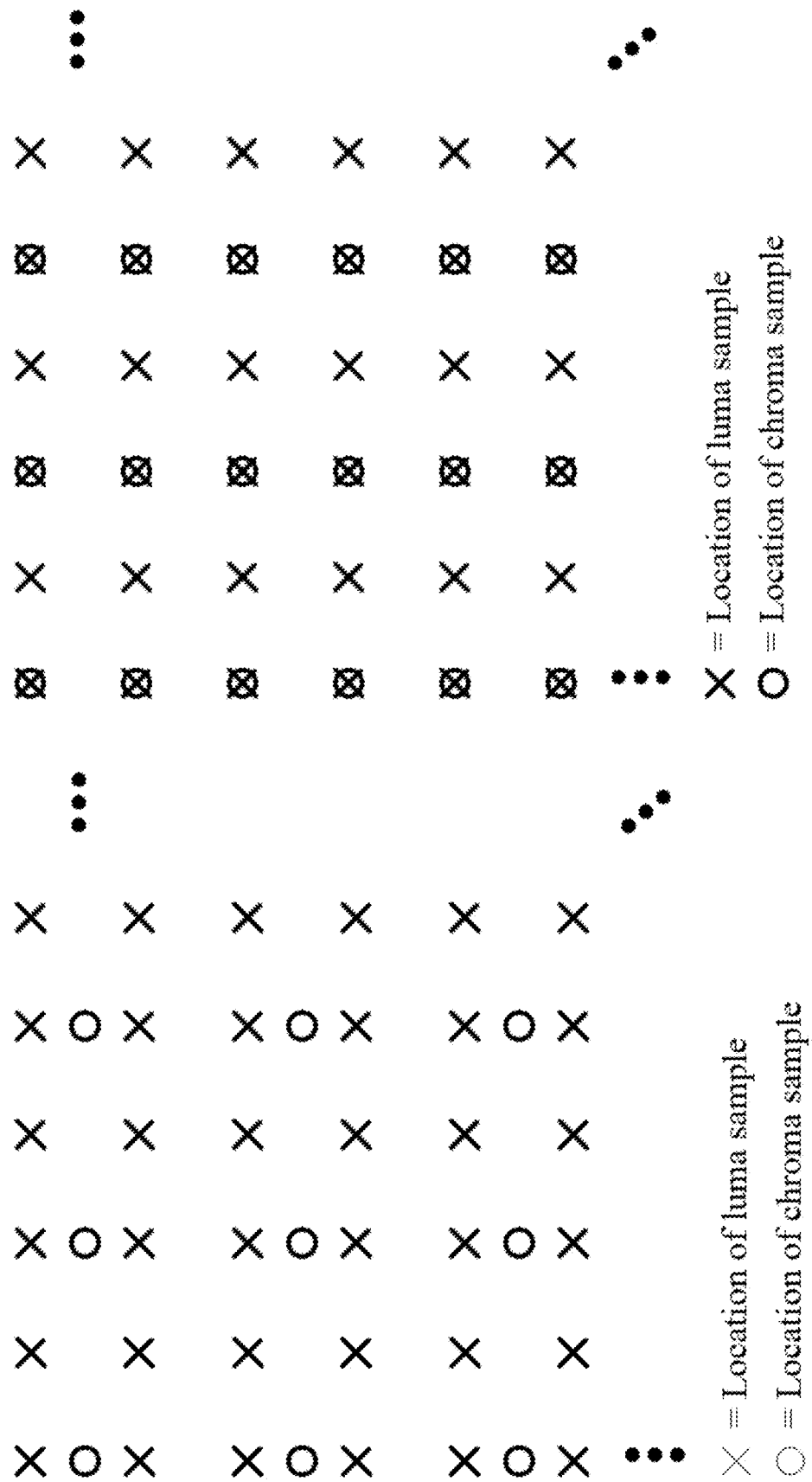

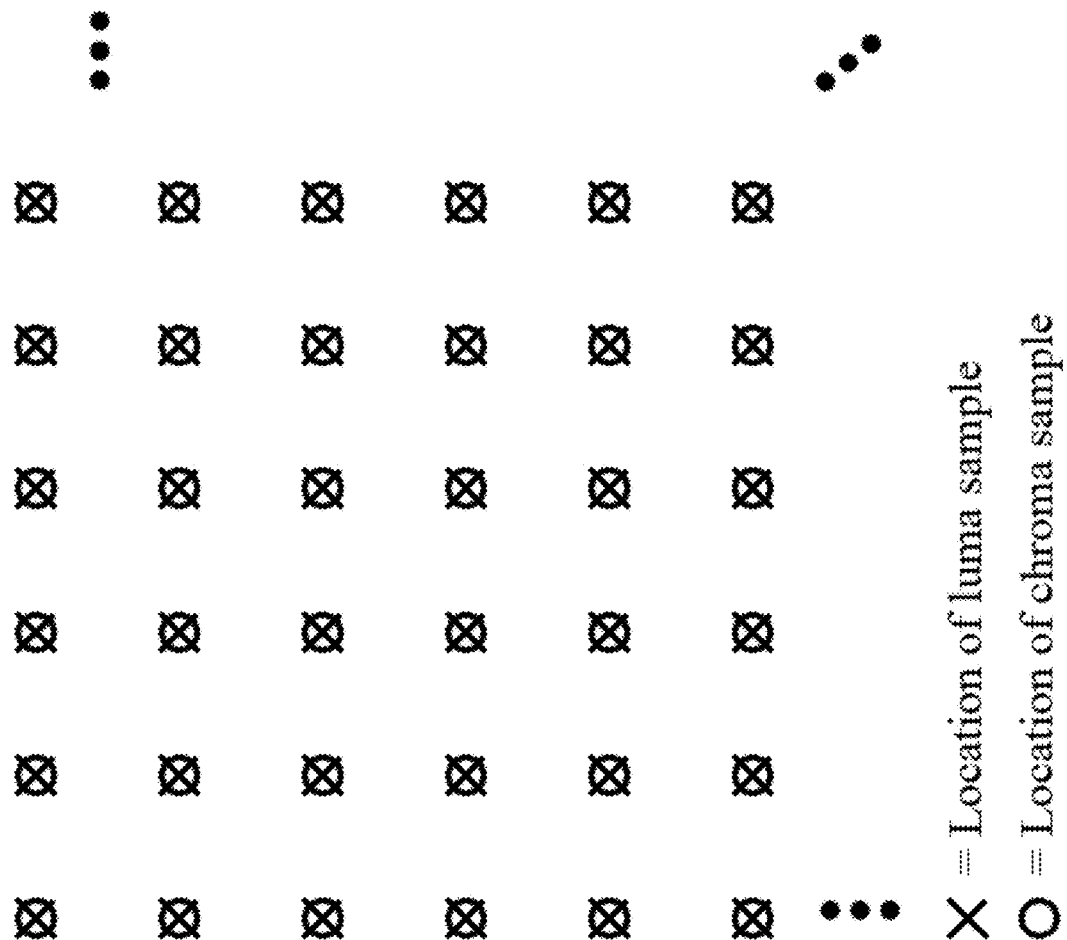

Table 2: Examples of multi-type tree splitting modes

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

| seq_parameter_set_rbsp( ) { | Descript or |
|---|---|
| ... | |
| if( ChromaArrayType != 0 ) | |
|    qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
|    sps_log2_diff_max_bt_min_qt_intra_slice_luma | ue(v) |
|    sps_log2_diff_max_tt_min_qt_intra_slice_luma | ue(v) |
| } | |
| if( sps_max_mtt_hierarchy_depth_inter_slice != 0 ) { | |
|    sps_log2_diff_max_bt_min_qt_inter_slice | ue(v) |
|    sps_log2_diff_max_tt_min_qt_inter_slice | ue(v) |
| } | |
| if( qtbtt_dual_tree_intra_flag ) { | |
|    sps_log2_diff_min_qt_min_cb_intra_slice_chroma | ue(v) |
|    sps_max_mtt_hierarchy_depth_intra_slice_chroma | ue(v) |
|    if( sps_max_mtt_hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | ue(v) |
|    } | |
| } | |
| sps_max_luma_transform_size_64_flag | u(1) |
| sps_joint_cbcr_enabled_flag | u(1) |
| ... | |
| } | |

FIG. 22

Table 3: Examples of Slice Types

| slice_type | Name of slice_type |
|---|---|
| 0 | B (B slice) |
| 1 | P (P slice) |
| 2 | I (I slice) |

FIG. 23

Table 4: Examples of Parallel TT Splitting and coding block size

|  | btSplit == SPLIT_BT_VER | btSplit == SPLIT_BT_HOR |
|---|---|---|
| parallelTtSplit | SPLIT_TT_VER | SPLIT_TT_HOR |
| cbSize | cbWidth | cbHeight |

FIG. 24

Table 5: Examples of coding block size

|  | ttSplit == SPLIT_TT_VER | ttSplit == SPLIT_TT_HOR |
|---|---|---|
| cbSize | cbWidth | cbHeight |

FIG. 25

Table 6: An exemplary syntax table

| seq_parameter_set_rbsp( ) { | Descriptor |
|---|---|
| ... | |
| if( ChromaArrayType != 0 ) | |
|    qtbtt_dual_tree_intra_flag | u(1) |
|    log2_min_luma_coding_block_size_minus2 | ue(v) |
|    if (qtbtt_dual_tree_intra_flag) | |
|      log2_min_chroma_coding_block_size_minus2 | ue(v) |
|    partition_constraints_override_enabled_flag | u(1) |
|    sps_log2_diff_min_qt_min_cb_intra_slice_luma | ue(v) |
|    sps_log2_diff_min_qt_min_cb_inter_slice | ue(v) |
|    sps_max_mtt_hierarchy_depth_inter_slice | ue(v) |
|    sps_max_mtt_hierarchy_depth_intra_slice_luma | ue(v) |
| ... | |

CHROMA QUAD TREE SPLIT CONSTRAINT

INCORPORATION BY REFERENCE

The present application is a continuation of U.S. application Ser. No. 17/060,652, filed on Oct. 1, 2020, which claims the benefit of priority to U.S. Provisional Application No. 62/953,034, "Methods on Constraint of Chroma Quad Tree Split" filed on Dec. 23, 2019 and U.S. Provisional Application No. 62/959,904, "Methods On Coding Block Sizes" filed on Jan. 11, 2020, which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding and/or decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (180) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding and/or decoding. In some examples, an apparatus for video decoding includes processing circuitry. The processing circuitry can decode partition information from a coded video bitstream. The partition information can indicate that a chroma coding tree structure in a dual tree is applied to a chroma block. The partition information can further indicate a block size of the chroma block in luma samples and a minimum allowed chroma quaternary tree (QT) leaf node size in luma samples. The processing circuitry can determine whether the block size of the chroma block in luma samples is less than or equal to the minimum allowed chroma QT leaf node size in luma samples. In response to the block size of the chroma block in luma samples being less than or equal to the minimum allowed chroma QT leaf node size in luma samples, the processing circuitry can determine that a QT split is disallowed for the chroma block.

In an embodiment, the partition information further indicates a multi-type tree (MTT) depth indicating whether the chroma block is a MTT node from a MTT split, a chroma horizontal subsampling factor, and a prediction mode type for the chroma block. In response to the block size of the chroma block in luma samples being larger than the minimum allowed chroma QT leaf node size in luma samples, the processing circuitry can determine that the QT split is disallowed for the chroma block based on at least one of (i) the MTT depth indicating that the chroma block is the MTT node, (ii) the block size of the chroma block in luma samples divided by the chroma horizontal subsampling factor being less than or equal to 4, and (iii) the prediction mode type indicating that an intra prediction mode and an intra block copy (IBC) mode are allowed.

In an embodiment, the partition information further indicates a minimum allowed chroma coding block size in luma samples and a minimum allowed luma coding block size in luma samples. The minimum allowed chroma coding block size in luma samples is less than the minimum allowed luma coding block size in luma samples. In an example, the coded video bitstream includes a chroma syntax element indicating the minimum allowed chroma coding block size in luma samples and a luma syntax element indicating the minimum allowed luma coding block size in luma samples. In an example, the minimum allowed chroma coding block size in luma samples is derived based on the minimum allowed luma coding block size in luma samples.

In an embodiment, the partition information further indicates a minimum allowed luma QT leaf node size in luma samples. The minimum allowed chroma QT leaf node size in luma samples is less than the minimum allowed luma QT leaf node size in luma samples.

In some examples, an apparatus for video decoding includes processing circuitry. The processing circuitry can decode partition information from a coded video bitstream. The partition information can indicate that a chroma coding tree structure in a dual tree is applied to a chroma block. The partition information can further indicate a block size of the chroma block in luma samples, a chroma vertical subsampling factor, and a minimum allowed chroma quaternary tree (QT) leaf node size. The processing circuitry can determine whether a QT split is disallowed for the chroma block based at least on the block size of the chroma block in luma samples, the chroma vertical subsampling factor, and the minimum allowed chroma QT leaf node size. In response to the QT split being disallowed for the chroma block, the processing circuitry can determine whether at least one of a binary tree split and a ternary tree split is disallowed for the chroma block. In an embodiment, the minimum allowed chroma QT leaf node size is in luma samples and the partition information further indicates a chroma horizontal subsampling factor. The processing circuitry can determine whether the QT split is disallowed for the chroma block based at least on the block size of the chroma block in luma samples, the chroma vertical subsampling factor, the chroma horizontal subsampling factor, and the minimum allowed chroma QT leaf node size in luma samples.

In an example, the processing circuitry can determine a parameter that is equal to the minimum allowed chroma QT leaf node size in luma samples multiplied by the chroma vertical subsampling factor and divided by the chroma horizontal subsampling factor. The processing circuitry can determine that the QT split is disallowed for the chroma block in response to the block size of the chroma block in luma samples being less than or equal to the parameter.

In an example, the partition information further indicates a multi-type tree (MTT) depth indicating whether the chroma block is a MTT node from a MTT split and a prediction mode type for the chroma block. The processing circuitry can determine whether the QT split is disallowed for the chroma block further based on the MTT depth and the prediction mode type.

In an example, the partition information further indicates a minimum allowed chroma coding block size in luma samples and a minimum allowed luma coding block size in luma samples. The minimum allowed chroma coding block size in luma samples is less than the minimum allowed luma coding block size in luma samples.

In an example, the coded video bitstream includes a chroma syntax element indicating the minimum allowed chroma coding block size in luma samples and a luma syntax element indicating the minimum allowed luma coding block size in luma samples.

In an example, the minimum allowed chroma coding block size in luma samples is derived based on the minimum allowed luma coding block size in luma samples.

In an example, the partition information further includes a minimum allowed luma QT leaf node size in luma samples. The minimum allowed chroma QT leaf node size in luma samples is less than the minimum allowed luma QT leaf node size in luma samples.

In an example, the minimum allowed chroma QT leaf node size is in chroma samples. The processing circuitry can determine that the QT split is disallowed for the chroma block based on the block size of the chroma block in luma samples divided by the chroma vertical subsampling factor being less than or equal to the minimum allowed chroma QT leaf node size in chroma samples.

In an example, the partition information further indicates a chroma horizontal subsampling factor, a MTT depth indicating whether the chroma block is a MTT node from a MTT split, and a prediction mode type for the chroma block. In response to the block size of the chroma block in luma samples divided by the chroma vertical subsampling factor being larger than the minimum allowed chroma QT leaf node size in chroma samples, the processing circuitry can determine whether the QT split is disallowed for the chroma block based on the block size of the chroma block in luma samples, the chroma horizontal subsampling factor, the MTT depth, and the prediction mode type.

Aspects of the disclosure also provide a non-transitory computer-readable medium storing instructions which when executed by a computer for video decoding cause the computer to perform any of the methods for video decoding.

BRIEF DESCRIPTION OF THE DRAWINGS

Further features, the nature, and various advantages of the disclosed subject matter will be more apparent from the following detailed description and the accompanying drawings in which:

FIG. 9 shows examples of chroma subsampling formats according to embodiments of the disclosure.

FIGS. 10A-10C show nominal vertical and horizontal relative locations of corresponding luma and chroma samples in respective pictures according to embodiments of the disclosure.

FIG. 17 shows examples of MTT splitting modes according to embodiments of the disclosure.

FIG. 22 shows exemplary syntax (2200) related to partitioning and block size in a sequence parameter set (SPS) according to an embodiment of the disclosure.

FIG. 23 shows examples of slice types according to an embodiment of the disclosure.

FIG. 24 shows exemplary derivations of variables for a parallel TT split and a coding block size according to an embodiment of the disclosure.

FIG. 25 shows exemplary derivations of a variable for coding block size according to an embodiment of the disclosure.

FIG. 26 shows an exemplary syntax table according to an embodiment of the disclosure.

DETAILED DESCRIPTION OF EMBODIMENTS

Figure 1A:
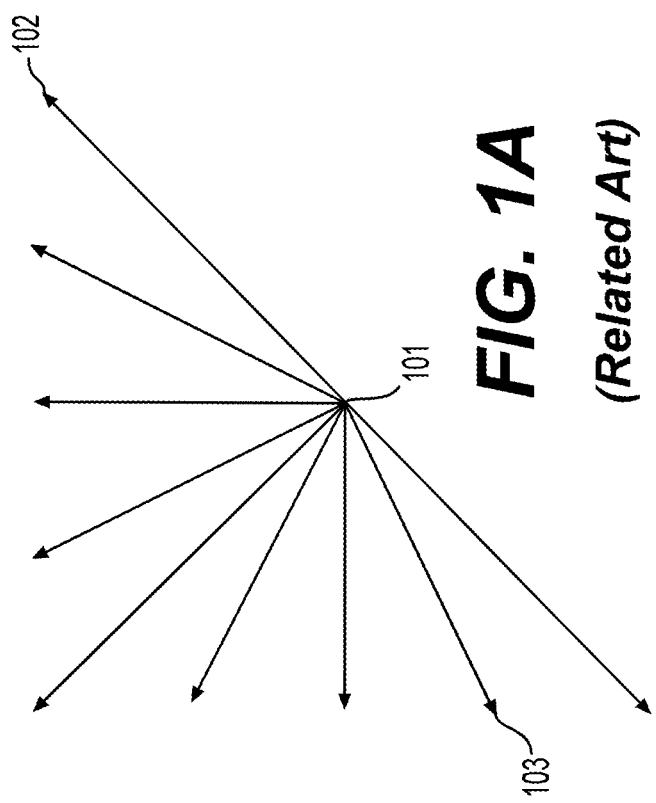
FIG. 1A is a schematic illustration of an exemplary subset of intra prediction modes.
Figure 1B:
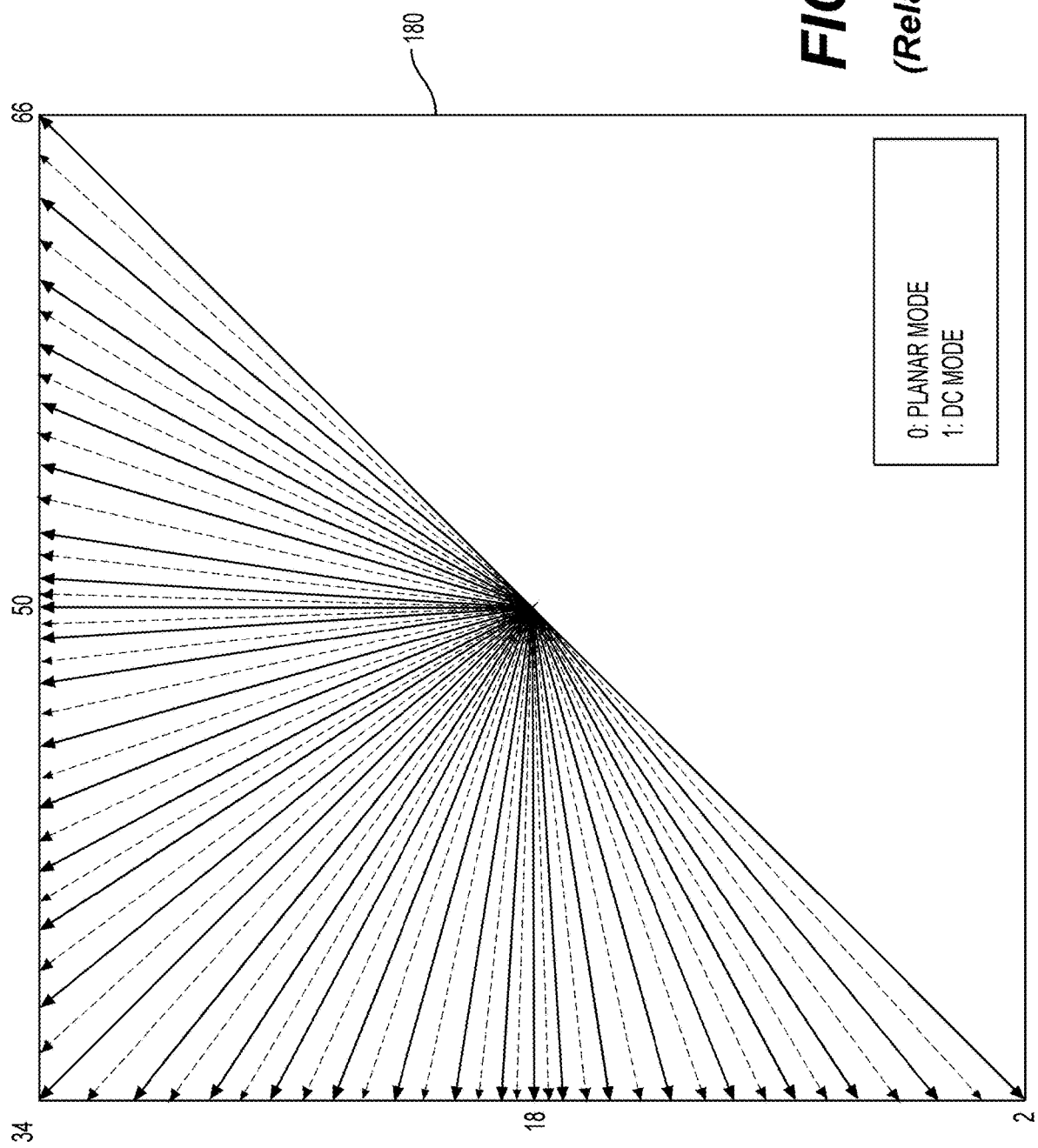
FIG. 1B is an illustration of exemplary intra prediction directions.
Figure 2:
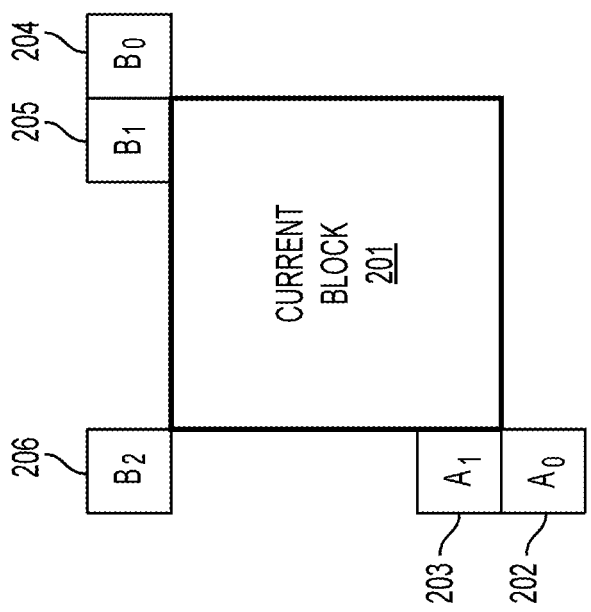
FIG. 2 is a schematic illustration of a current block and its surrounding spatial merge candidates in one example.
Figure 3:
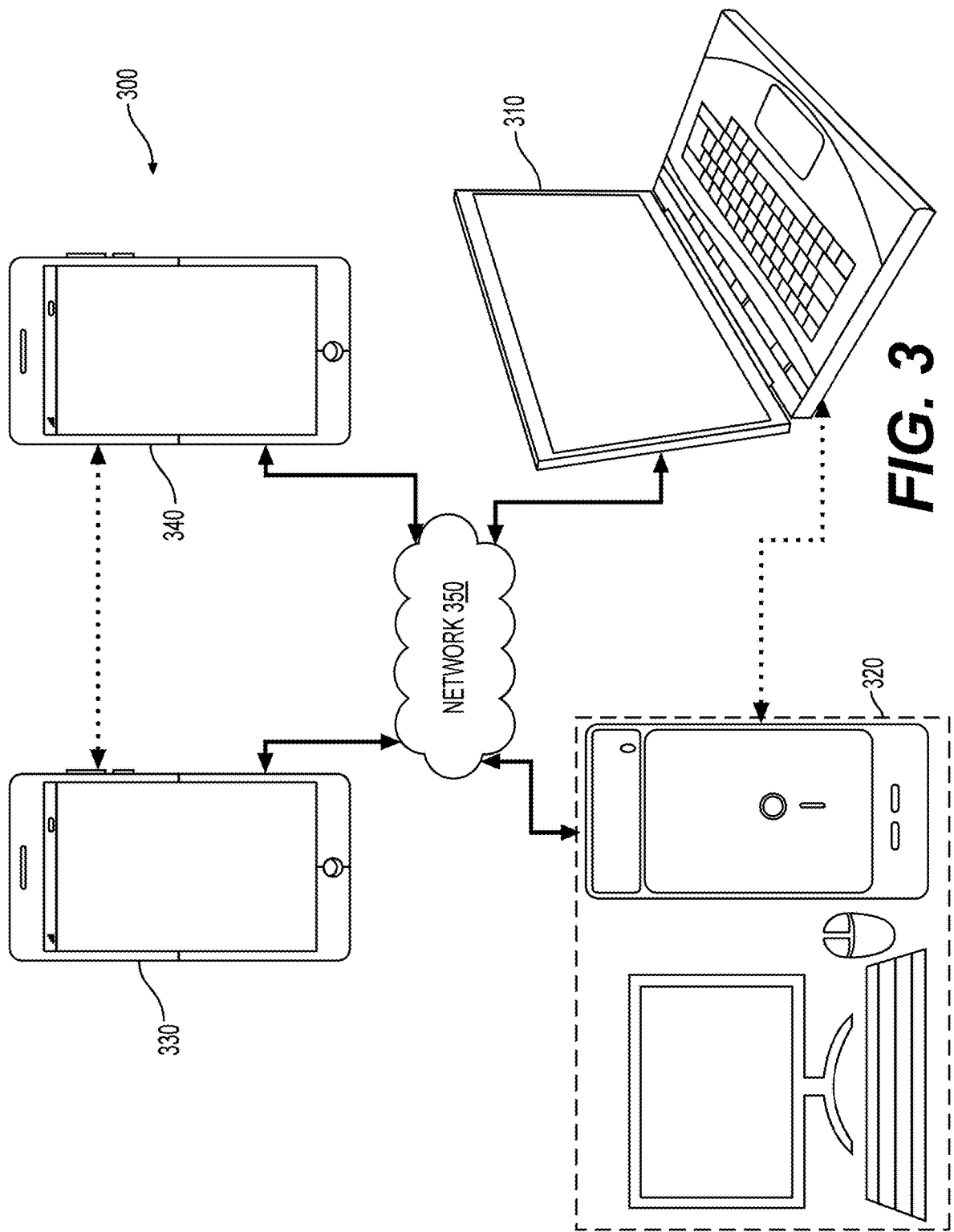
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
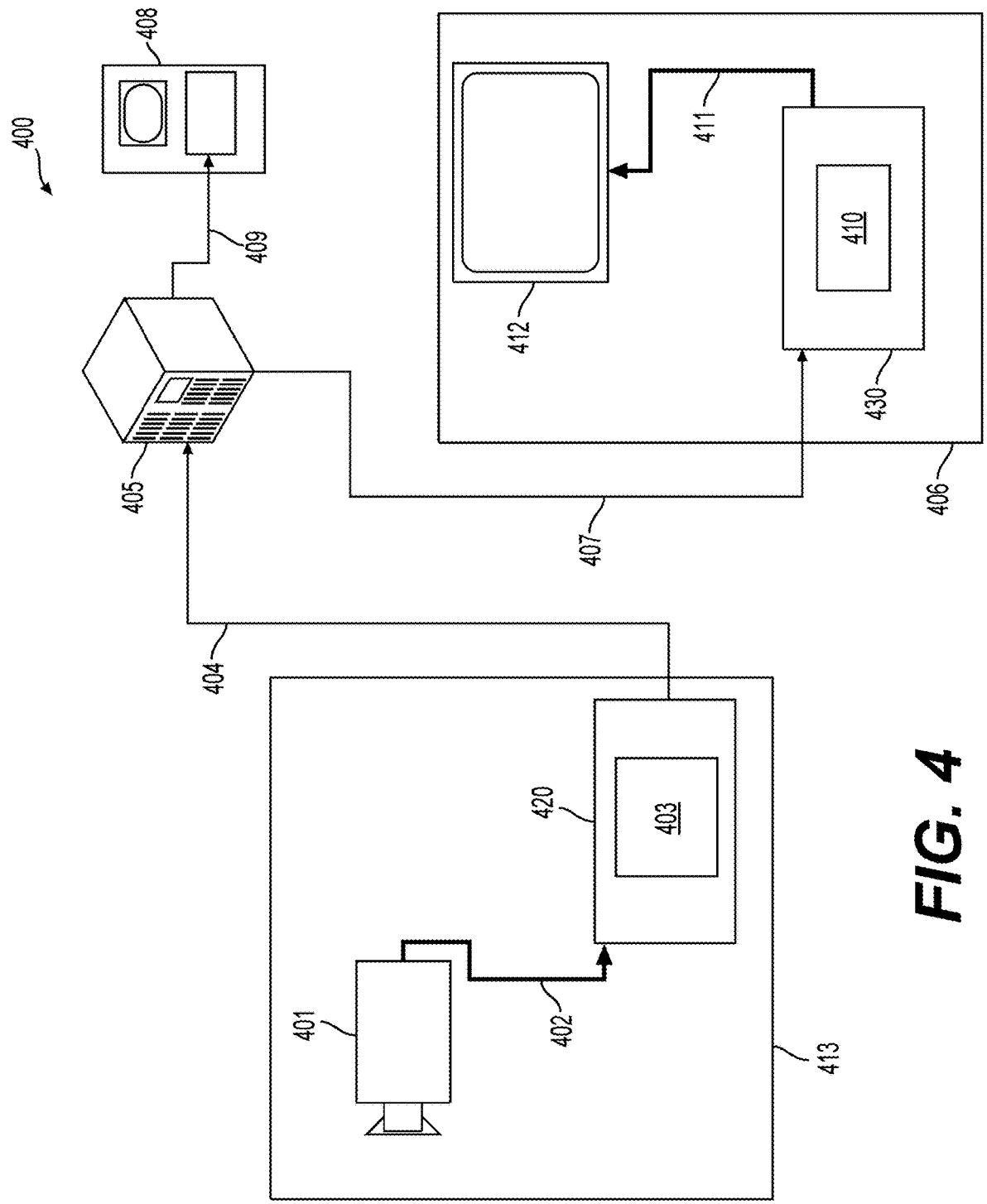
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
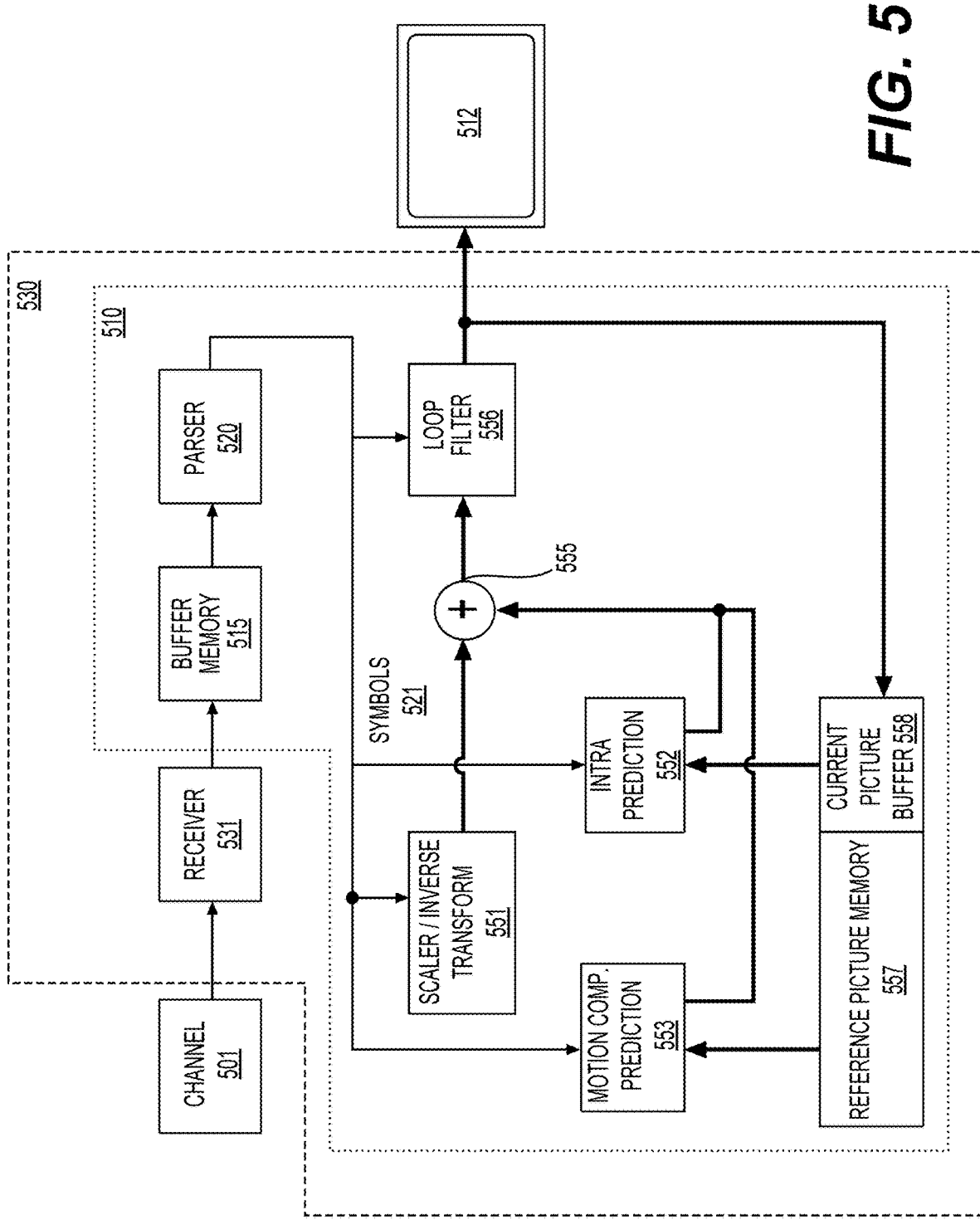
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
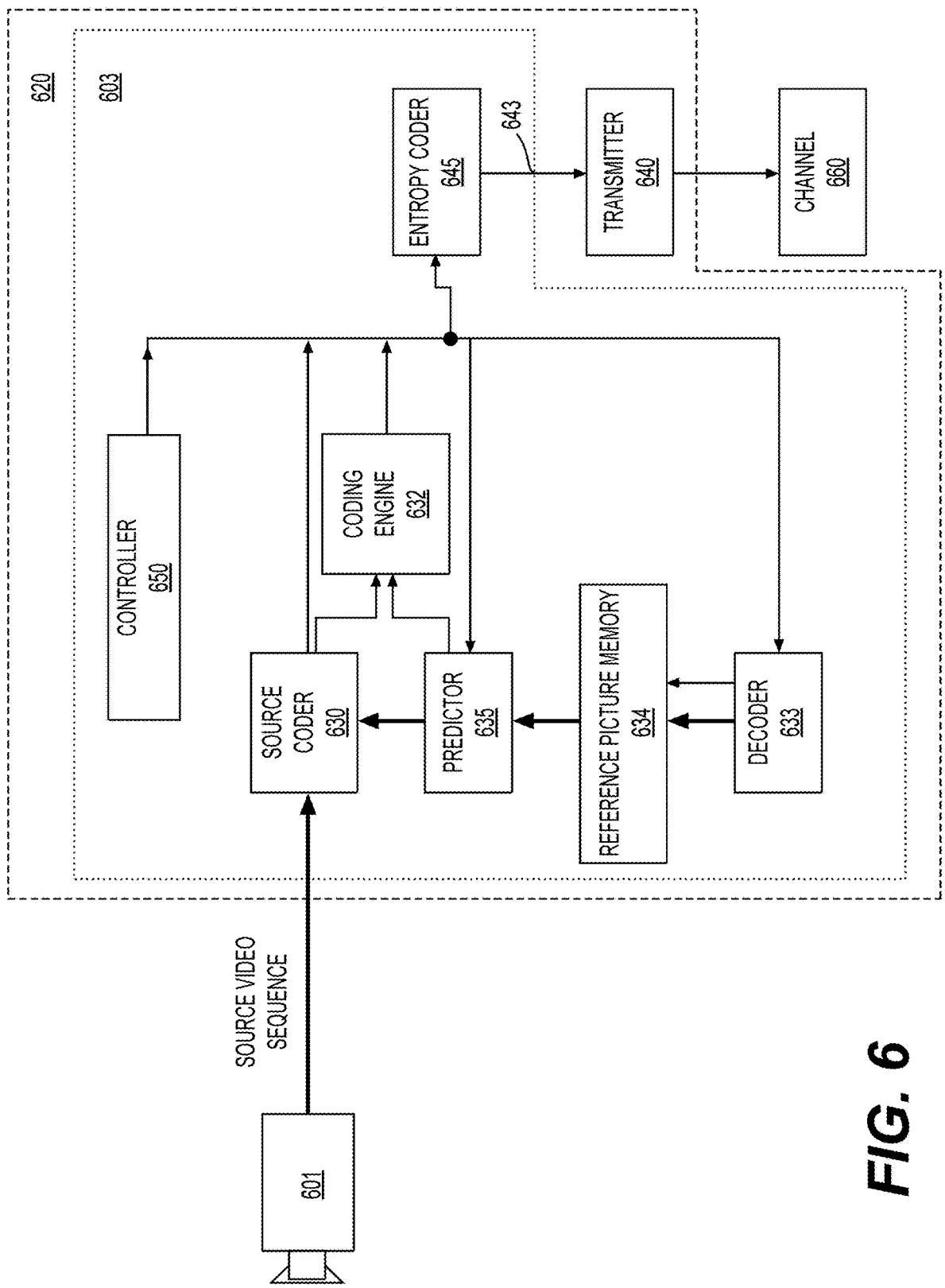
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any color space (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding and/or decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding and/or decoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding and/or decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding and/or decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
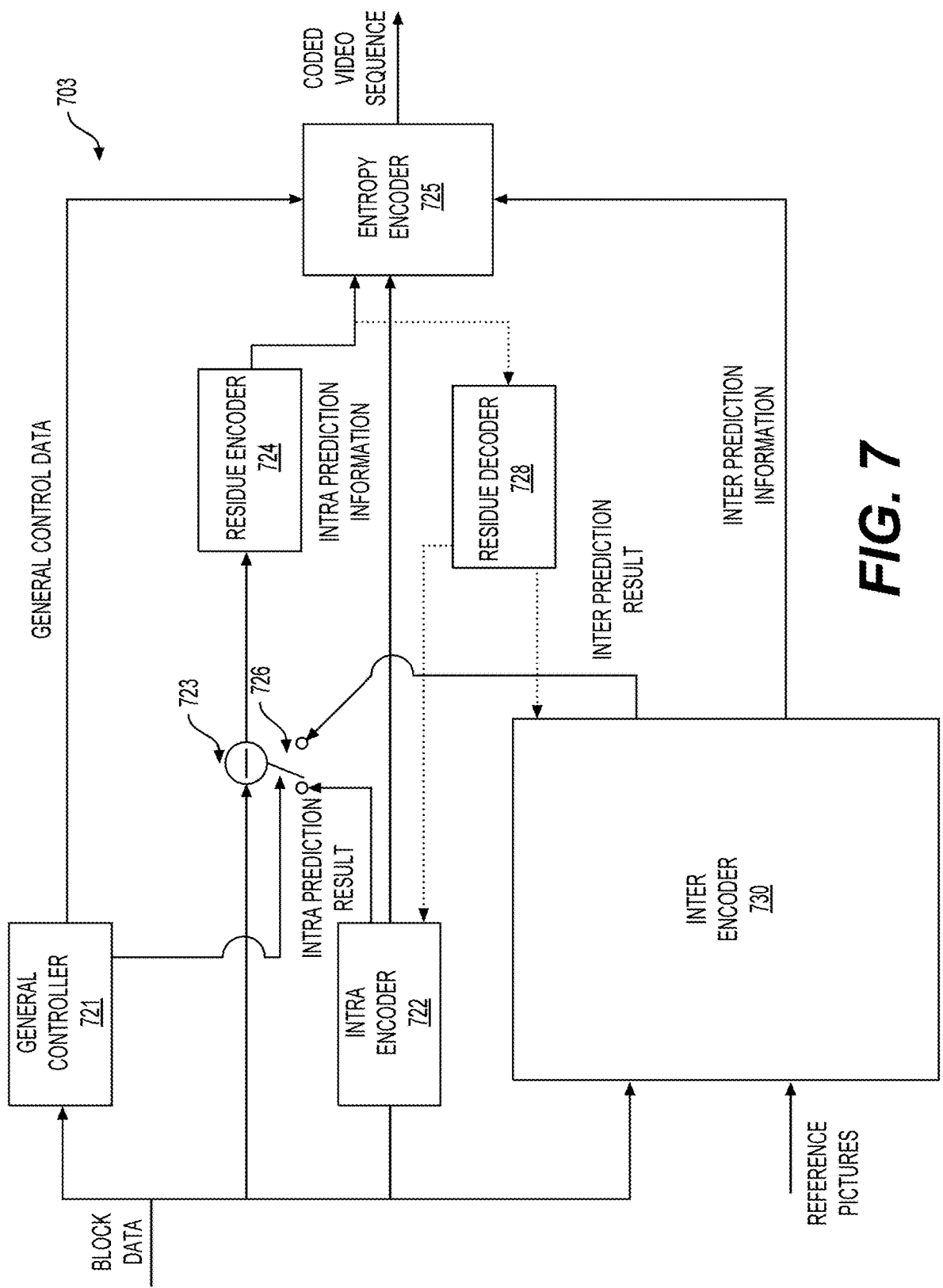
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
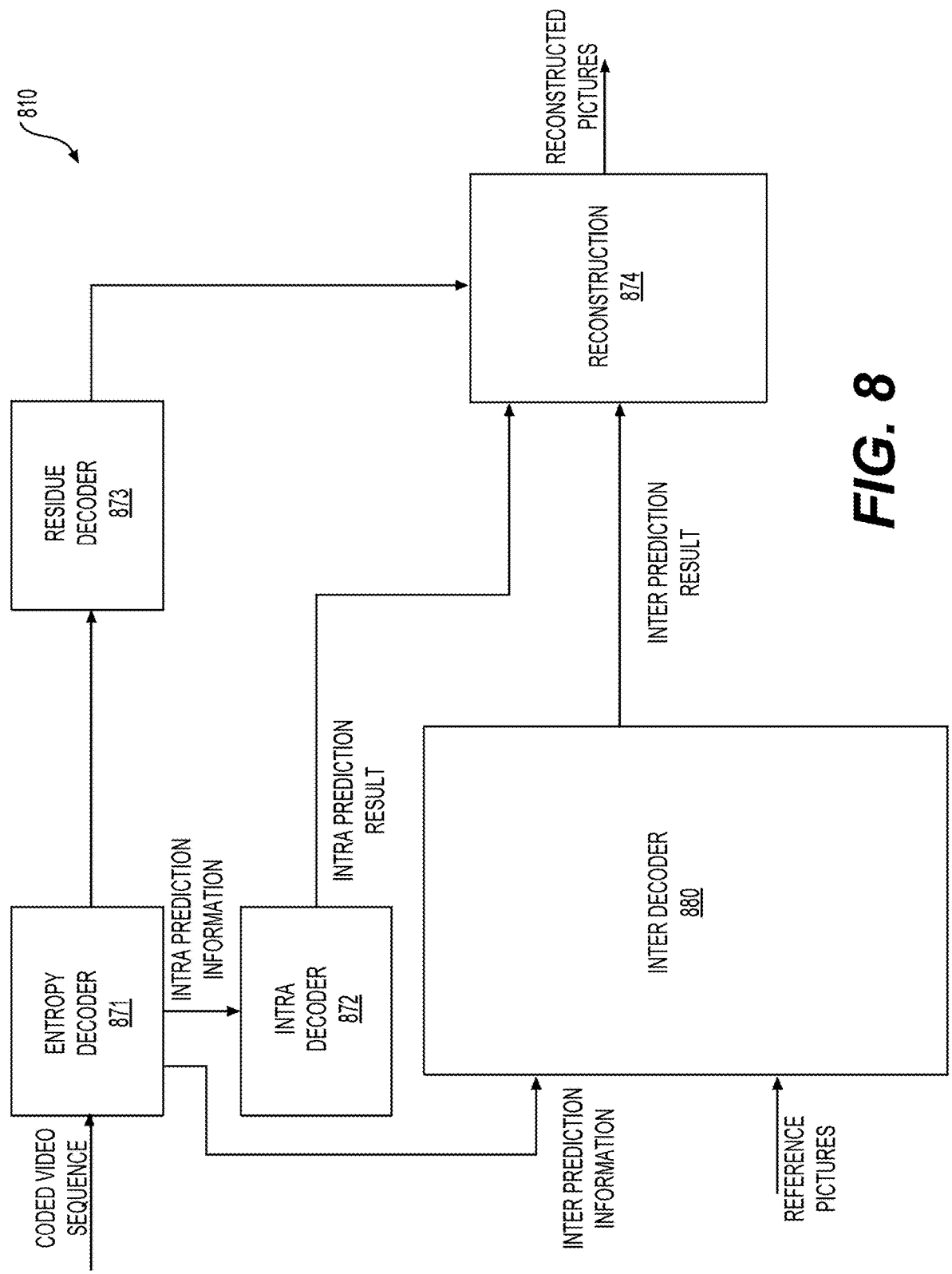
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Aspects of the disclosure are related to coding tools for partitioning in a video codec, such as methods in which coding block (CB) sizes are constrained for quad-tree (QT) splitting and/or the like. Further, aspects of the disclosure include methods of deriving a minimum size of chroma coding block, a minimum size of chroma QT node, and/or the like.

An exemplary relationship between source and decoded pictures that is given via a bitstream is described below. The video source represented by the bitstream can be a sequence of pictures in a decoding order. The source and the decoded pictures can each include one or more sample arrays, such as (1) Luma (Y) only (monochrome), (2) Luma and two chroma (e.g., YCbCr or YCgCo), (3) Green, blue, and red (GBR, also known as RGB), and (4) Arrays representing other unspecified monochrome or tri-stimulus color samplings (e.g., YZX, also known as XYZ).

For convenience of notation and terminology in the disclosure, variables and terms associated with the above described arrays can be referred to as luma (or L or Y) and chroma, where the two chroma arrays can be referred to as Cb and Cr regardless of the actual color representation method in use. The actual color representation method in use can be further indicated by syntax.

When multiple sample arrays, such as Luma and chroma array(s) (or blocks), are included in the source and the decoded pictures, variables such as a chroma horizontal subsampling factor (e.g., SubWidthC) and a chroma vertical subsampling factor (e.g., SubHeightC) between the chroma block(s) and the corresponding luma block can be specified. The variables SubWidthC and SubHeightC (also referred to as chroma sub sampling ratios) can be specified in Table 1 (shown in FIG. 9) depending on a chroma format sampling structure, for example, that is specified through a chroma subsampling format (also referred to as a chroma format, e.g., specified by chroma_format_idc) and a flag (e.g., separate_colour_plane_flag) (optional). Other values of chroma_format_idc, SubWidthC and SubHeightC may also be specified.

Referring to FIG. 9, when the a chroma format index (e.g., chroma_format_idc) is 0, the chroma subsampling format can be 'Monochrome' corresponding to a monochrome sampling having only one sample array, which is nominally considered to be the luma array.

When the chroma format index is 1, the chroma subsampling format can be 4:2:0 or 4:2:0 sampling, each of the two chroma arrays has half the height and half the width of the corresponding luma array.

When the chroma format index is 2, the chroma subsampling format can be 4:2:2 or 4:2:2 sampling, each of the two chroma arrays has the same height and half the width of the luma array.

When the chroma format index is 3, the chroma subsampling format can be 4:4:4 or 4:4:4 sampling, depending on the value of a separate color plane flag (e.g., separate_colour_plane_flag), the following applies: (i) If the separate color plane flag is equal to 0, each of the two chroma arrays has the same height and width as the luma array; (ii) Otherwise, the separate color plane flag is equal to 1, the three color planes can be separately processed as monochrome sampled pictures.

A number of bits used for the representation of each of the samples in the luma and chroma arrays in a video sequence can be in a range of 8 bits to 16 bits, inclusive, and the number of bits used in the luma array may differ from the number of bits used in the chroma arrays.

FIGS. 10A-10C show nominal vertical and horizontal relative locations of corresponding luma and chroma samples in respective pictures according to embodiments of the disclosure. Alternative chroma sample relative locations may be indicated in video usability information.

Referring to FIG. 10A, the value of a chroma format index (e.g., chroma_format_idc) being equal to 1 can indicate 4:2:0. FIG. 10A shows an example of the nominal vertical and horizontal locations of the corresponding luma and chroma samples in a picture.

Referring to FIG. 10B, the value of the chroma format index being equal to 2 can indicate 4:2:2, and thus the chroma samples are co-sited (or co-located) with the corresponding luma samples in a picture. FIG. 10B shows an example of the nominal vertical and horizontal locations of the corresponding luma and chroma samples in a picture.

Referring to FIG. 10C, when the value of the chroma format index is equal to 3, all array samples (e.g., the luma array samples and the two chroma array samples) can be co-sited (or co-located). FIG. 10C shows an example of the nominal vertical and horizontal locations of the corresponding luma and chroma samples in a picture.

Figure 11:
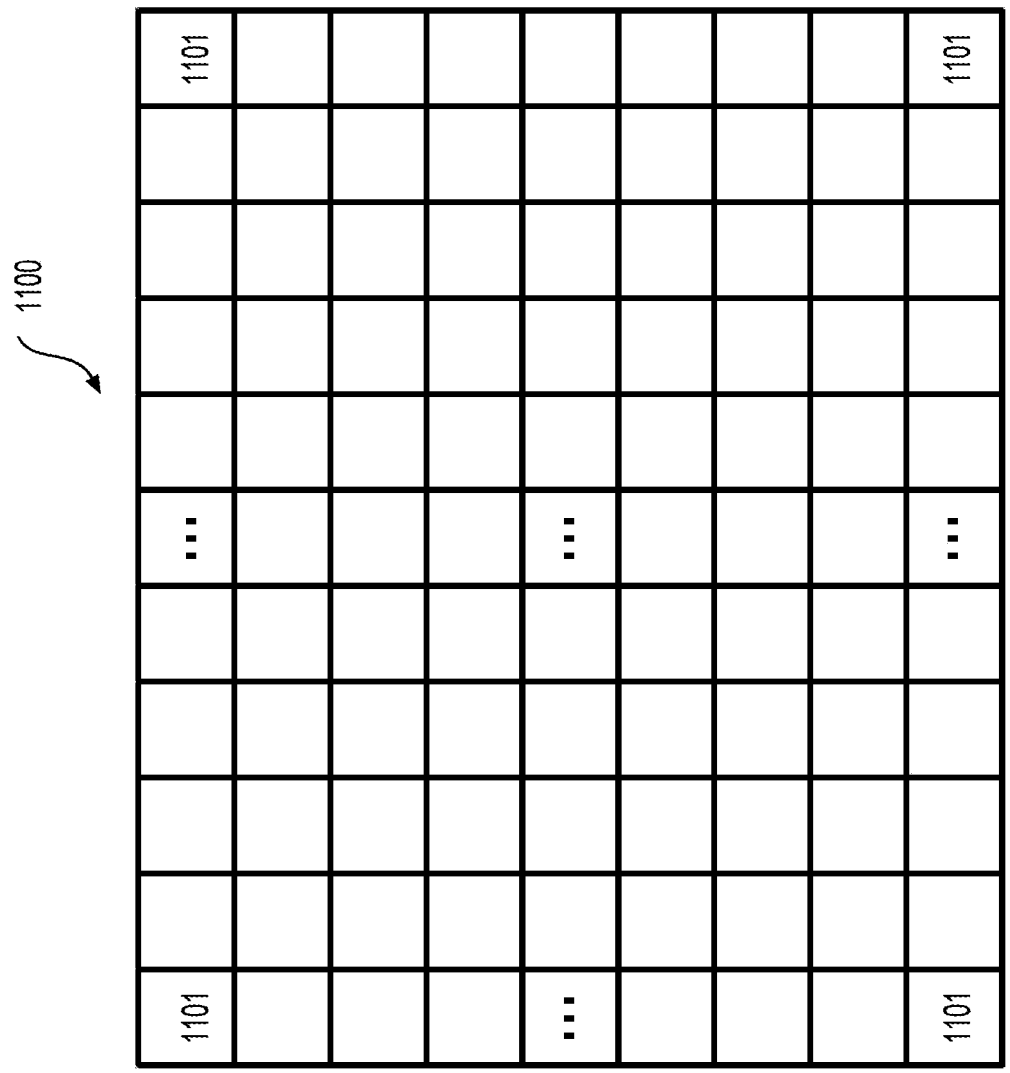
FIG. 11 shows an example of a picture (1100) divided into CTUs (1101) according to an embodiment of the disclosure

An example of partitioning, such as in VVC, is described below. In an embodiment, a picture can be partitioned into CTUs. Pictures can be divided into a sequence of CTUs. For a picture that has three sample arrays, a CTU can include an N×N block (e.g., a luma block) of luma samples together with two corresponding blocks (e.g., two chroma blocks) of chroma samples. FIG. 11 shows an example of a picture (1100) divided into CTUs (1101) according to an embodiment of the disclosure. In an example, the maximum allowed size of a luma block in a CTU is specified to be 128×128. In an example, the maximum size of luma transform blocks is 64×64.

Pictures can be partitioned into slices, tiles, and/or bricks. A picture can be divided into one or more tile rows and one or more tile columns. A tile can be a sequence of CTUs that covers a rectangular region of a picture. A tile can be divided into one or more bricks, each of which can include a number of CTU rows within the tile. A tile that is not partitioned into multiple bricks can also be referred to as a brick. However, a brick that is a true subset of a tile is not referred to as a tile.

A slice can include a number of tiles in a picture or a number of bricks in a tile. Two modes of slices, e.g., a raster-scan slice mode and a rectangular slice mode, can be supported. In the raster-scan slice mode, a slice can include a sequence of tiles in a tile raster scan of a picture. In the rectangular slice mode, a slice can include a number of bricks of a picture that can collectively form a rectangular region of the picture. The bricks within a rectangular slice are in an order of a brick raster scan of the slice.

Figure 12:
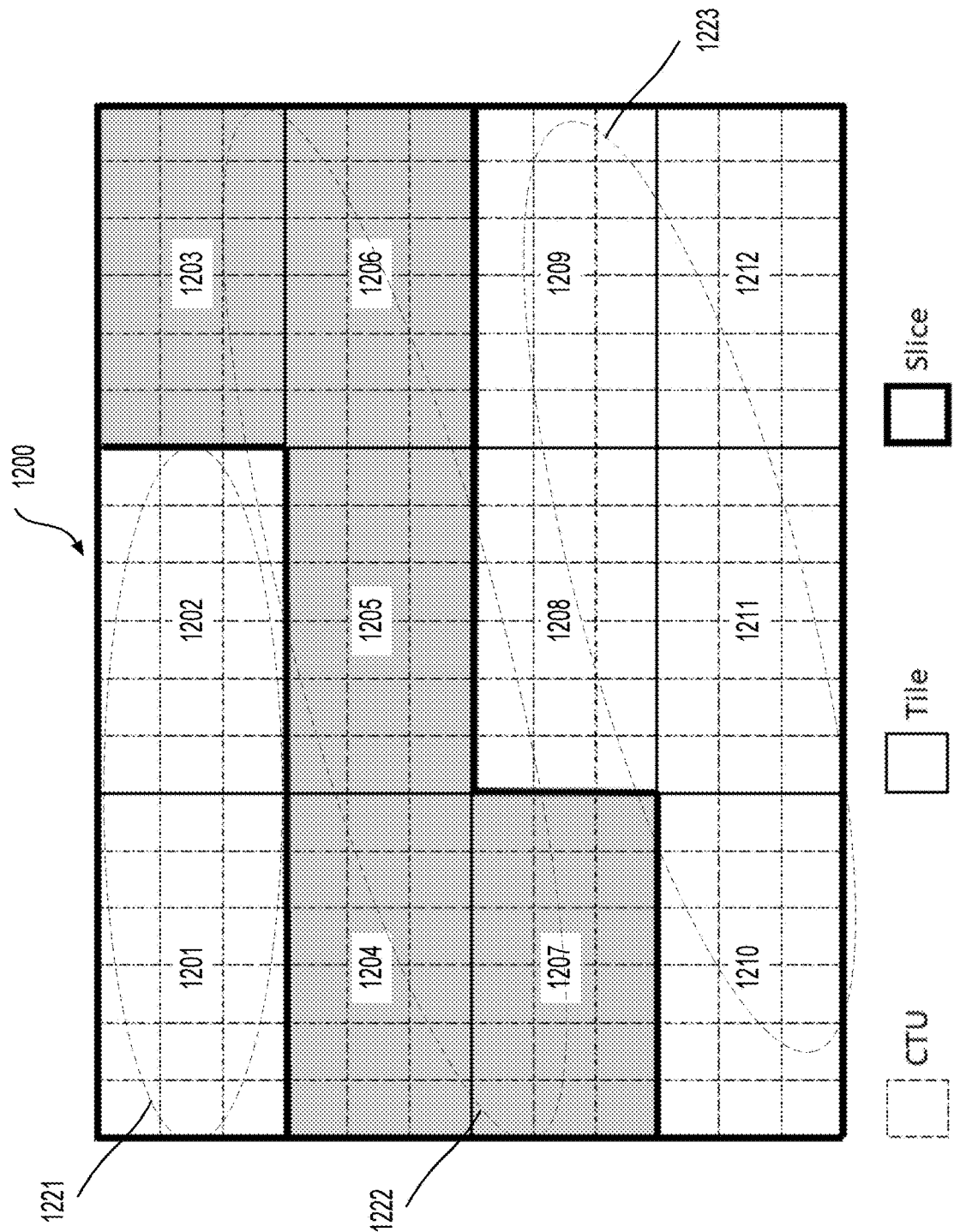
FIG. 12 shows an example of a raster-scan slice partitioning of a picture (1200) according to an embodiment of the disclosure.

A picture can be partitioned into tiles and raster-scan slices. FIG. 12 shows an example of a raster-scan slice partitioning of a picture (1200) according to an embodiment of the disclosure. The picture (1200) can be divided into 12 tiles (1201)-(1212) (e.g., 12 tiles in 3 columns (or tile columns) and 4 rows (or tile rows)) and 3 raster-scan slices (1221)-(1223). For example, the raster-scan slice (1221) includes the tiles (1201)-(1202), the raster-scan slice (1222) includes the tiles (1203)-(1207), and the raster-scan slice (1223) includes the tiles (1208)-(1212).

Figure 13:
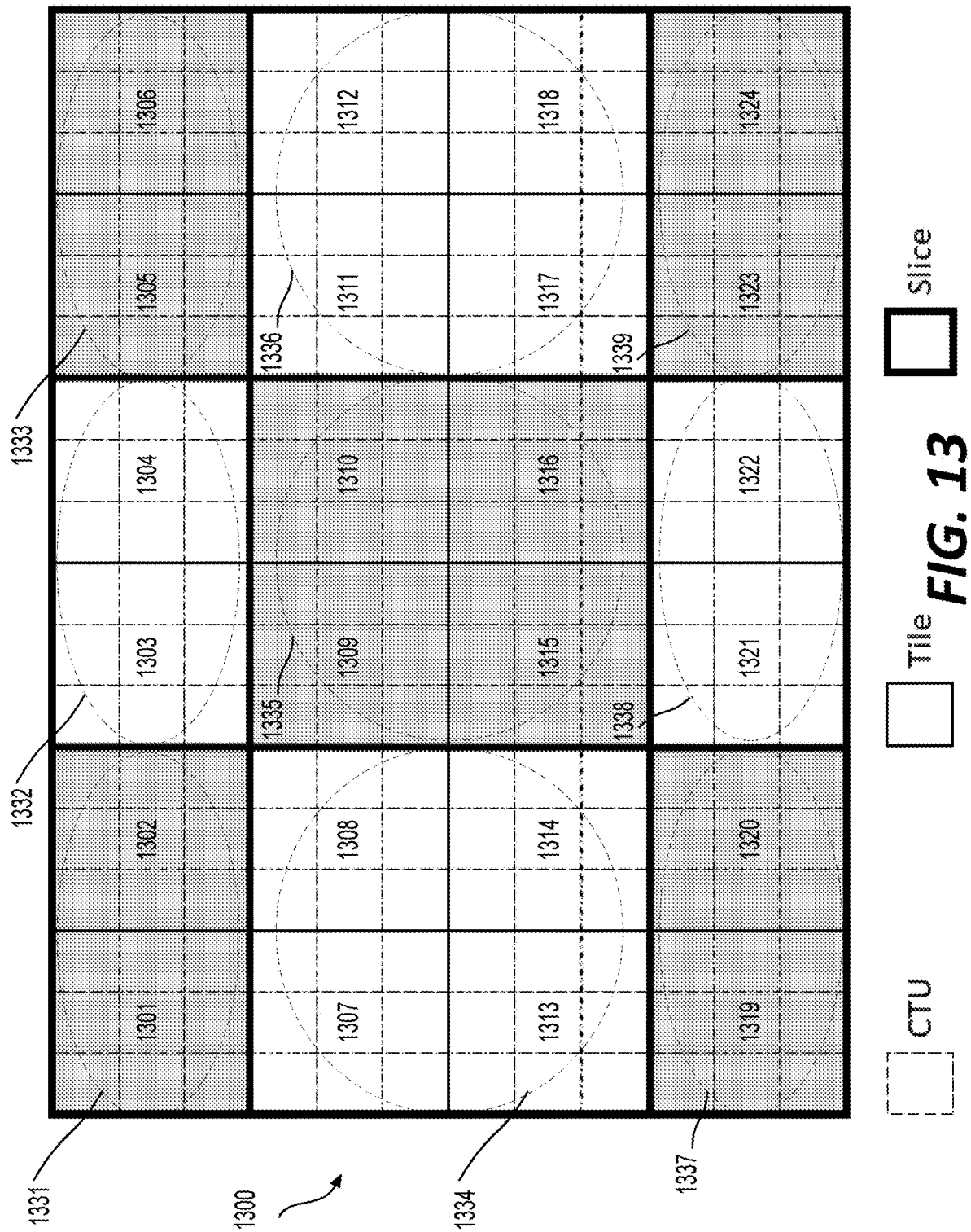
FIG. 13 shows an example of a rectangular slice partitioning of a picture (1300) according to an embodiment of the disclosure.

A picture can be partitioned into tiles and rectangular slices. FIG. 13 shows an example of a rectangular slice partitioning of a picture (1300) according to an embodiment of the disclosure. The picture (1300) can be divided into 24 tiles (1301)-(1324) (e.g., 24 tiles in 6 columns (or tile columns) and 4 rows (or tile rows)) and 9 rectangular slices (1331)-(1339). For example, the rectangular slice (1331) includes the tiles (1301)-(1302); the rectangular slice (1332) includes the tiles (1303)-(1304); the rectangular slice (1333) includes the tiles (1305)-(1306); the rectangular slice (1334) includes the tiles (1307), (1308), (1313), and (1314); the rectangular slice (1335) includes the tiles (1309), (1310), (1315), and (1316); the rectangular slice (1336) includes the tiles (1311), (1312), (1317), and (1318); the rectangular slice (1337) includes the tiles (1319)-(1320); the rectangular slice (1338) includes the tiles (1321)-(1322); and the rectangular slice (1339) includes the tiles (1323)-(1324).

Figure 14:
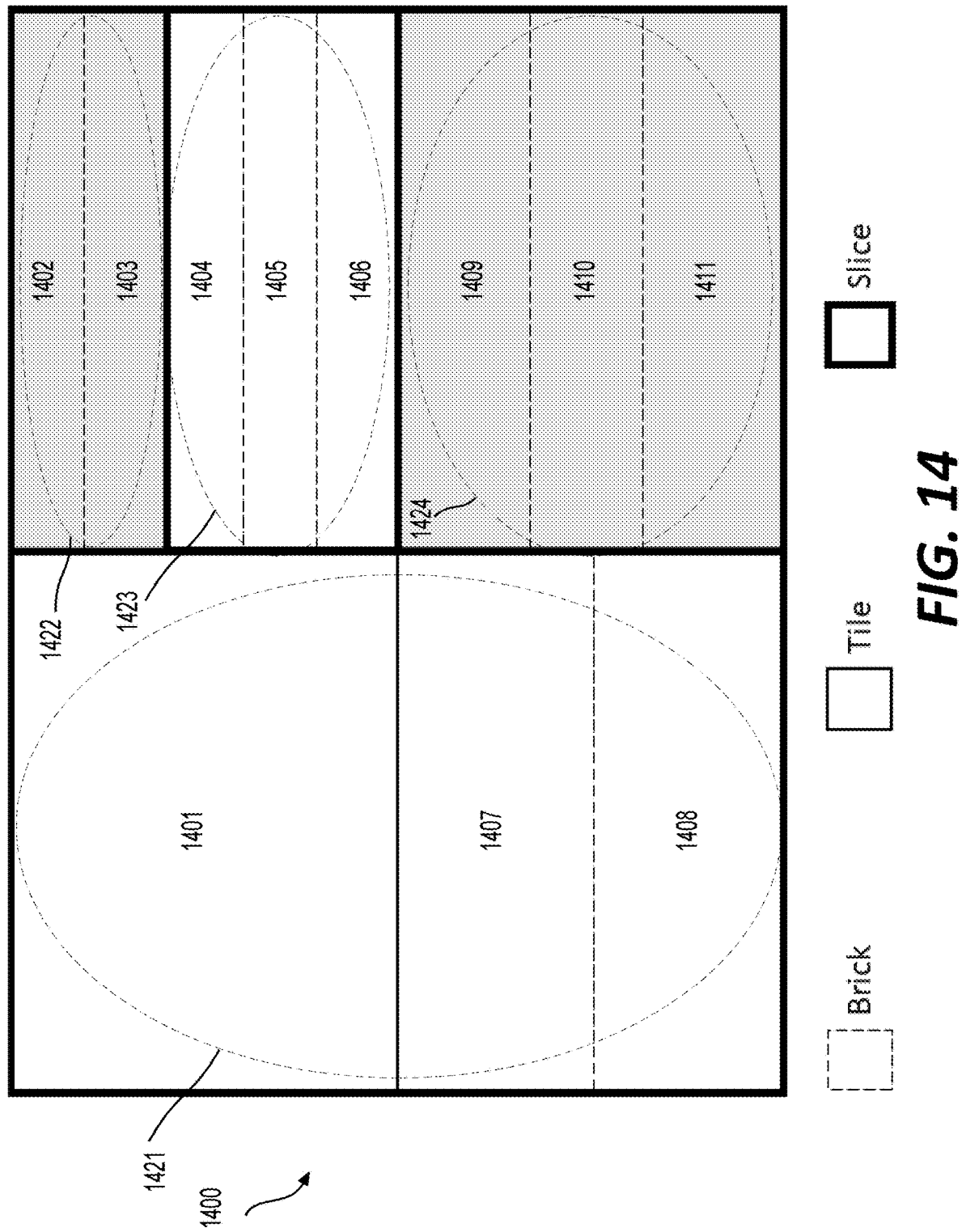
FIG. 14 shows an example of a picture (1400) partitioned into tiles, bricks (1401)-(1411), and rectangular slices (1421)-(1424) according to an embodiment of the disclosure.

A picture can be partitioned into tiles, bricks, and rectangular slices. FIG. 14 shows an example of a picture (1400) partitioned into tiles, bricks (1401)-(1411), and rectangular slices (1421)-(1424) according to an embodiment of the disclosure. The picture (1400) can be divided into the four tiles (e.g., two tile columns and two tile rows), the eleven bricks (1401)-(1411), and the four rectangular slices (1421)-(1424). The top-left tile includes one brick (1401), the top-right tile includes five bricks (1402)-(1406), the bottom-left tile includes two bricks (1407)-(1408), and the bottom-right tile includes three bricks (1409)-(1411). The rectangular slice (1421) includes the bricks (1401), (1407), and (1408); the rectangular slice (1422) includes the bricks (1402) and (1403); the rectangular slice (1423) includes the bricks (1404)-(1406); and the rectangular slice (1424) includes the bricks (1409)-(1411).

A CTU can be partitioned using a tree structure. In an embodiment, such as in HEVC, a CTU can be split into CU(s) by using a quaternary-tree or a QT structure denoted as a coding tree to adapt to various local characteristics. A decision whether to code a picture area using inter-picture (or temporal) or intra-picture (or spatial) prediction can be made at a leaf CU level. Each leaf CU can be further split into one, two or four PUs according to the PU splitting type. Inside a PU, the same prediction process can be applied and the relevant information can be transmitted to a decoder on a PU basis. After obtaining a residual block by applying the prediction process based on the PU splitting type, a leaf CU can be partitioned into transform units (TUs) according to a QT structure similar to the coding tree for the CU. In an example, such as in the HEVC structure, multiple partition units, such as CU, PU, and TU can be different.

Figure 15:
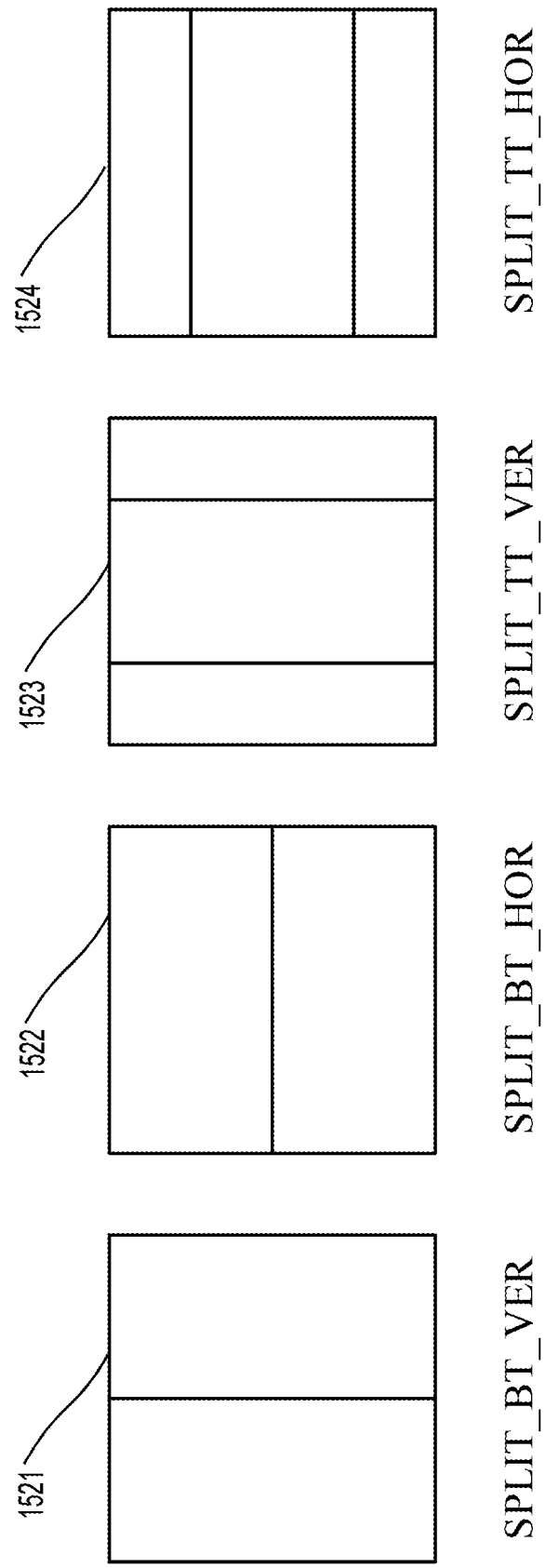
FIG. 15 shows exemplary splitting types (1521)-(1524) in a multi-type tree (MTT) structure according to embodiments of the disclosure.

In an embodiment, such as in VVC, a quadtree with nested multi-type tree using binary and ternary splits segmentation structure can replace the concepts of multiple partition unit types, and thus can remove the separation of the CU, PU and TU concepts and can support more flexibility for CU partition shapes. In some examples, when a CU has a size too large for a maximum transform length, different sizes may be used for CU, PU, and/or TU. In the coding tree structure, a CU can have either a square or rectangular shape. A CTU can be first partitioned by a QT structure. Then the QT leaf nodes can be further partitioned by a multi-type tree (MTT) structure. FIG. 15 show exemplary splitting types (1521)-(1524) in a MTT structure according to embodiments of the disclosure. The splitting types (1521)-(1524) can include a vertical binary splitting (SPLIT_BT_VER) (1521), a horizontal binary splitting (SPLIT_BT_HOR) (1522), a vertical ternary splitting (SPLIT_TT_VER) (1523), and a horizontal ternary splitting (SPLIT_TT_HOR) (1524). The MTT leaf nodes can be referred to CUs, and unless the CU is too large for the maximum transform length, the segmentation (or the CU) can be used for prediction and transform processing without any further partitioning. Thus, in most cases, the CU, PU and TU can have the same block size in the QT with a nested MTT coding block structure. One exception occurs when the maximum supported transform length is smaller than the width or height of the color component of the CU.

Figure 16:
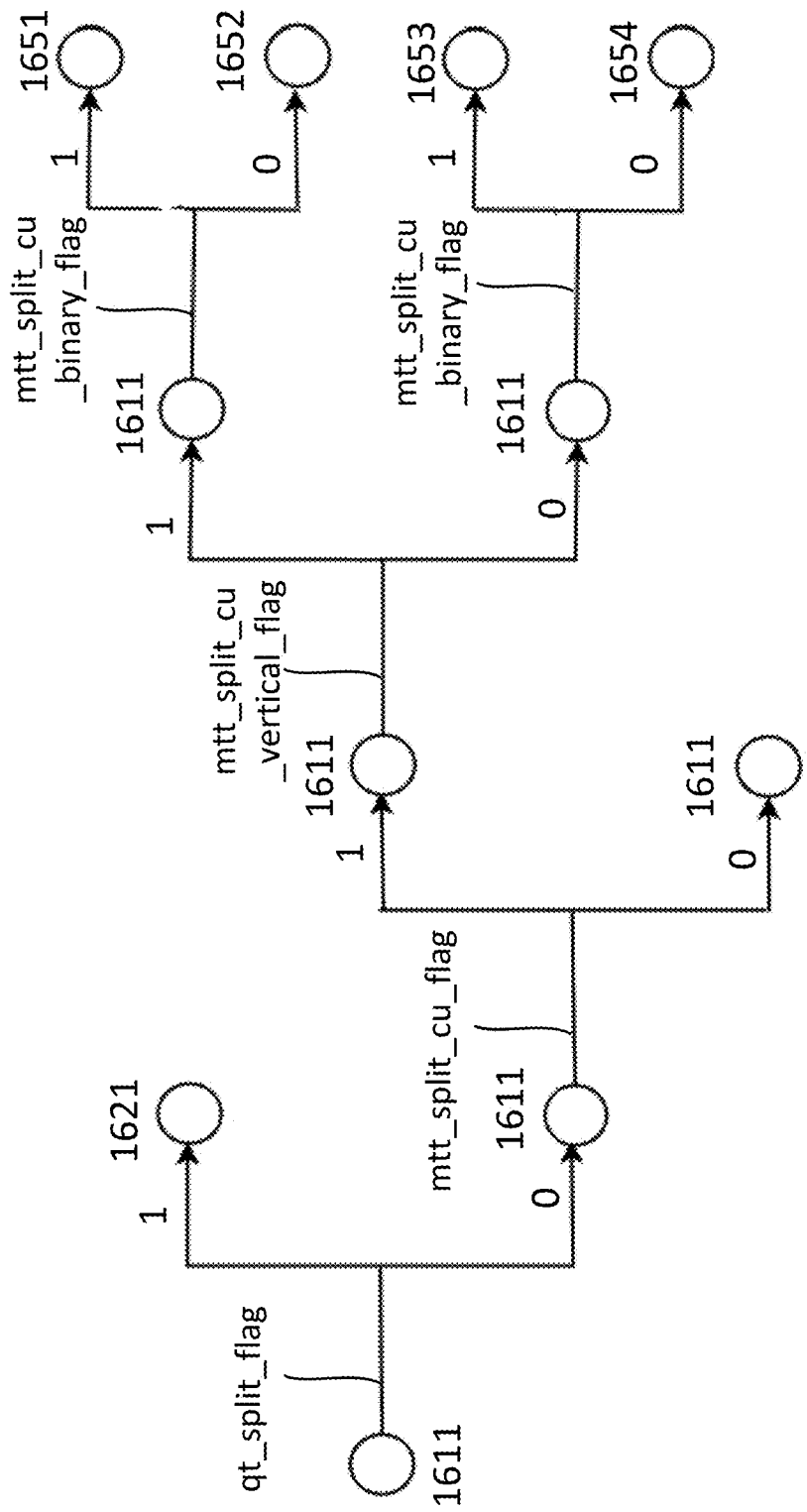
FIG. 16 shows examples of splitting flags signaling in a quaternary tree (QT) with nested MTT coding tree structure according to an embodiment of the disclosure.

FIG. 16 shows examples of splitting flags signaling for a QT with a nested MTT coding tree structure according to an embodiment of the disclosure. FIG. 16 illustrates an exemplary signaling mechanism of partition splitting information in the QT with the nested MTT coding tree structure. A node (1611), such as a CTU, can be treated as a root of a QT and can be first partitioned by a QT structure into QT nodes when a QT splitting flag (e.g., qt_split_flag) is true (e.g., a value '1') to generate QT nodes (1621). When the QT splitting flag (e.g., qt_split_flag) is false (e.g., a value '0'), the node (1611) is not split using the QT splitting, and thus can be referred to as a QT leaf node (1611). Each QT leaf node (when sufficiently large to allow it) can be further partitioned by a MTT structure, and can be referred to as a MTT node. Referring to FIG. 16, the QT leaf node or the MTT node (1611) can be further partitioned using MTT splitting.

In the MTT structure, a first flag (e.g., a mtt_split_cu_flag) can be signaled to indicate whether the node (1611) is further partitioned. When the node (1611) is not partitioned (e.g., mtt_split_cu_flag being '0'), the node (1611) is referred to as a MTT leaf node (1611). When the node (1611) is further partitioned (e.g., mtt_split_cu_flag being '1'), a second flag (e.g., a mtt_split_cu_vertical_flag) can be signaled to indicate a splitting direction (a horizontal split or a vertical split), and then a third flag (e.g., a mtt_split_cu_binary_flag) can be signaled to indicate whether the split is a binary split or a ternary split. Accordingly, MTT nodes (1651) is generated based on a vertical binary split (e.g., BT_VER_split) of the node (1611), MTT nodes (1652) is generated based on a vertical ternary split (e.g., TT_VER_split) of the node (1611), MTT nodes (1653) is generated based on a horizontal binary split (e.g., BT_HOR_split) of the node (1611), and MTT nodes (1654) is generated based on a horizontal ternary split (e.g., TT_HOR_split) of the node (1611).

Referring to FIG. 17, based on the values of the second flag (e.g., the mtt_split_cu_vertical_flag) and the third flag (e.g., mtt_split_cu_binary_flag), the MTT splitting mode (e.g., a MttSplitMode) of a CU can be derived as shown in Table 2. The MTT splitting modes can include the vertical binary split (e.g., BT_VER_split or SPLIT_BT_VER), the vertical ternary split (e.g., TT_VER split or SPLIT_TT_VER), the horizontal binary split (e.g., BT_HOR_split or SPLIT_BT_HOR), and the horizontal ternary split (e.g., TT_HOR_split or SPLIT_TT_HOR).

Figure 18:
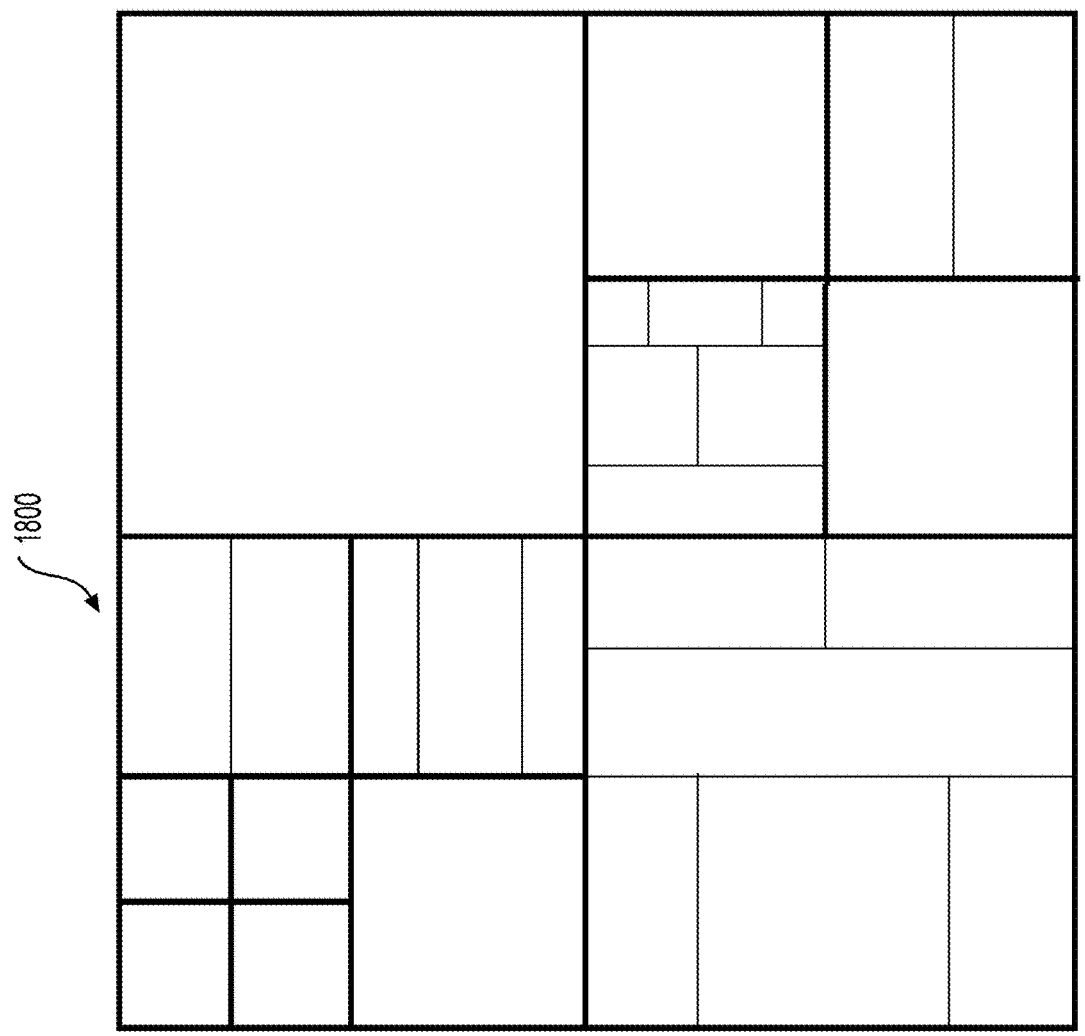
FIG. 18 shows an example of QT with a nested MTT coding block structure according to an embodiment of the disclosure.

FIG. 18 shows example of QT with a nested MTT coding block structure according to an embodiment of the disclosure. A CTU (1800) can be divided into multiple CUs with a QT and a nested MTT coding block structure, where bold block edges represent QT partitioning and remaining edges represent MTT partitioning. The QT with the nested MTT partition can provide a content-adaptive coding tree structure including CUs. A size of a CU can be any suitable size. A size of a CU may be as large as the CTU (1800) or as small as 4×4 in units of luma samples. In an example, for the 4:2:0 chroma format, the maximum chroma CB size can be 64×64 and the minimum chroma CB size can be 2×2.

In an example, such as VVC, the maximum supported luma transform size is 64×64 and the maximum supported chroma transform size is 32×32. When a width or a height of a CB is larger the maximum transform width or height, the CB can be automatically split in the horizontal and/or vertical direction to meet the transform size restriction in the respective direction.

The following parameters can be defined and specified by sequence parameter set (SPS) syntax elements for the QT with the nested MTT coding tree scheme. The following parameters can include (1) a CTU size that is a root node size of a QT tree, (2) a MinQTSize that is a minimum allowed QT leaf node size, (3) a MaxBtSize that is a maximum allowed BT root node size, (4) a MaxTtSize that is a maximum allowed TT root node size, (5) a MaxMttDepth that is a maximum allowed hierarchy depth of MTT splitting from a QT leaf, (6) a MinBtSize that is a minimum allowed BT leaf node size, (7) a MinTtSize that is a minimum allowed TT leaf node size, and/or the like.

In an example of the QT with the nested MTT coding tree structure, the CTU size is set as 128×128 luma samples with two corresponding 64×64 blocks of 4:2:0 chroma samples, the MinQTSize is set as 16×16, the MaxBtSize is set as 128×128, the MaxTtSize is set as 64×64, the MinBtSize and MinTtSize (for both width and height) is set as 4×4, and the MaxMttDepth is set as 4. The QT partitioning can be applied to the CTU first to generate QT leaf nodes. The QT leaf nodes can have a size from 16×16 (e.g., the MinQTSize) to 128×128 (e.g., the CTU size). In an example, if the QT leaf node is 128×128, the QT leaf node is not further split by the BT since the size exceeds the MaxBtSize and the MaxTtSize (e.g., 64×64). Otherwise, the QT leaf node can be further partitioned by the MTT. Therefore, the QT leaf node can also be a root node for the MTT and can have a MTT depth (e.g., a MttDepth) of 0. When the MTT depth reaches the MaxMtt-Depth (e.g., 4), no further splitting is considered. When the MTT node has a width equal to the MinBtSize and smaller or equal to 2×MinTtSize, no further horizontal splitting is considered. Similarly, when the MTT node has a height equal to the MinBtSize and smaller or equal to 2×MinTt-Size, no further vertical splitting is considered.

Figure 19:
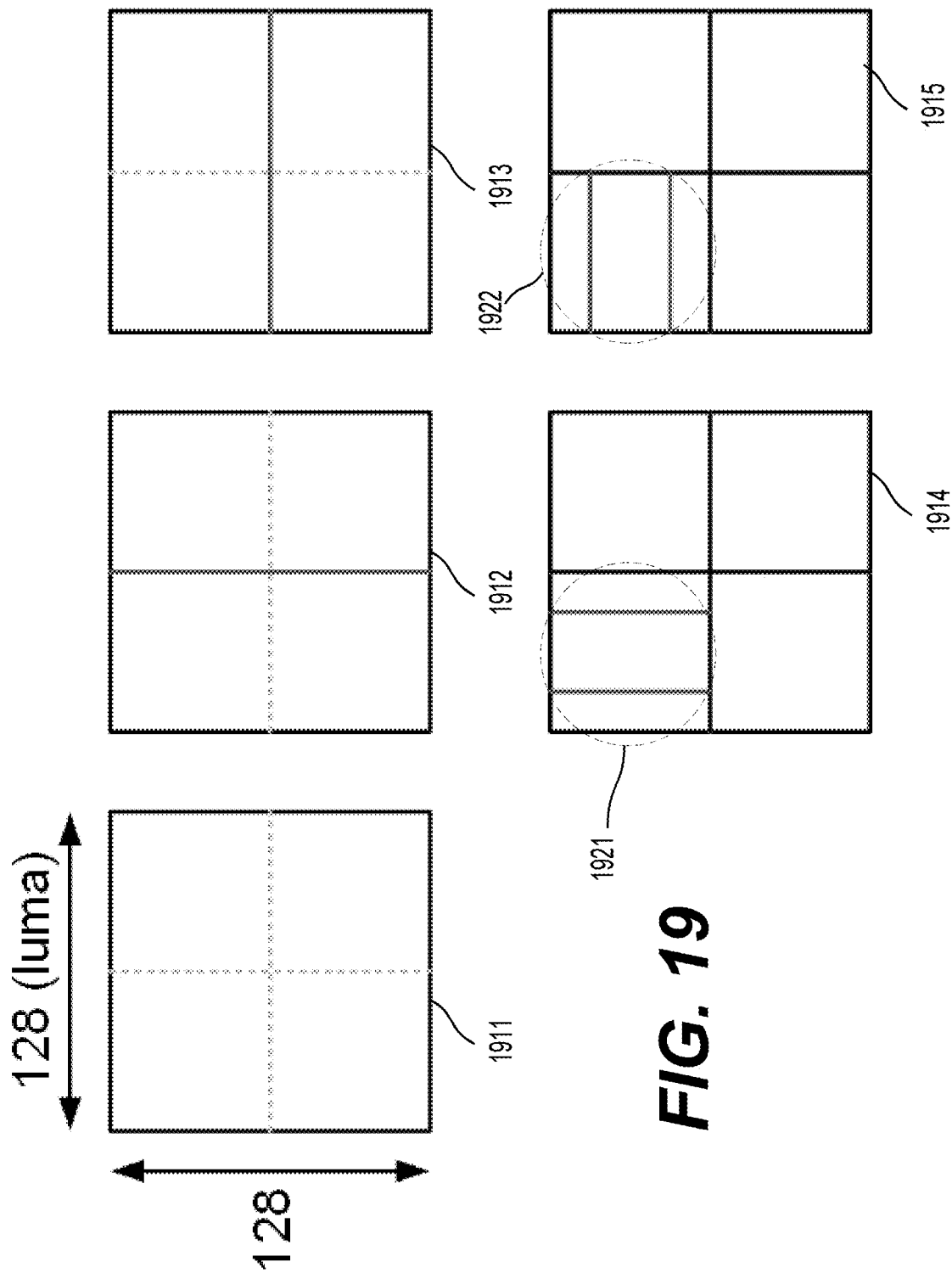
FIG. 19 shows examples of restrictions to ternary tree (TT) splits according to embodiments of the disclosure.

In an embodiment, to allow 64×64 Luma block and 32×32 Chroma pipelining design, such as in VVC hardware decoders, TT split can be forbidden when either a width or a height of a luma coding block is larger than a first threshold (e.g., 64), as shown in FIG. 19. Thus, no TT split is applied to a luma coding block that is larger than 64, such as a 128×128 luma coding block. TT split may also be forbidden when either a width or a height of a chroma coding block is larger than a second threshold (e.g., 32). Referring to FIG. 19, the first threshold is 64, and the TT split is forbidden in luma coding blocks (1911)-(1915) as the luma coding blocks (1911)-(1915) have a size of 128×128. For example, the luma coding block (1911) is not split and the luma coding blocks (1912)-(1913) are split using BT. The luma coding blocks (1914)-(1915) are first QT split into 64×64 blocks. Subsequently, the TT split can be applied to luma coding blocks (1921)-(1922) having a size of 64×64.

In an embodiment, the coding tree scheme supports the ability for a luma component and corresponding chroma component(s) to have separate block tree structures. In an example, for P and B slices, luma and chroma CTBs in a CTU share a same coding tree structure (e.g., a single tree). For I slices, luma and chroma CTBs in a CTU can have separate block tree structures (e.g., a dual tree). When a separate block tree mode (e.g., a dual tree) is applied, a luma CTB can be partitioned into luma CUs by a luma coding tree structure (e.g., DUAL_TREE_LUMA), and chroma CTBs can be partitioned into chroma CUs by a chroma coding tree structure (e.g., DUAL_TREE_CHROMA). Thus, a CU in an I slice can include a coding block of the luma component or coding blocks of two chroma components, and a CU in a P or B slice includes coding blocks of all three color components unless the video is monochrome.

CU can be split at a picture boundary (also referred to as boundary) as described below. In an example, such as in HEVC, when a portion of a tree node block exceeds a bottom picture boundary or a right picture boundary, the tree node block is forced to be split until all samples of every coded CU are located inside the picture boundaries. In some examples, the following splitting rules can be applied:

If a portion of a tree node block exceeds both a bottom picture boundary and a right picture boundary,
  If the tree node block is a QT node and a size of the tree node block is larger than the minimum QT size, the tree node block is forced to be split with a QT split mode.
  Otherwise, the tree node block is forced to be split with a SPLIT_BT_HOR mode.
Otherwise if a portion of the tree node block exceeds the bottom picture boundary,
  If the tree node block is the QT node, and the size of the tree node block is larger than the minimum QT size, and the size of the tree node block is larger than the maximum BT size, the tree node block is forced to be split with the QT split mode.
  Otherwise, if the tree node block is the QT node, and the size of the tree node block is larger than the minimum QT size and the size of the tree node block is smaller than or equal to the maximum BT size, the tree node block is forced to be split with the QT split mode or the SPLIT_BT_HOR mode.
  Otherwise (the tree node block is a BTT node or the size of the tree node block is smaller than or equal to the minimum QT size), the tree node block is forced to be split with the SPLIT_BT_HOR mode.
Otherwise if a portion of the tree node block exceeds the right picture boundary,
  If the tree node block is the QT node, and the size of the tree node block is larger than the minimum QT size, and the size of the tree node block is larger than the maximum BT size, the tree node block is forced to be split with the QT split mode.
  Otherwise, if the tree node block is the QT node, and the size of the tree node block is larger than the minimum QT size and the size of the tree node block is smaller than or equal to the maximum BT size, the tree node block is forced to be split with the QT split mode or a SPLIT_BT_VER mode.
  Otherwise (the tree node block is the BTT node or the size of the tree node block is smaller than or equal to the minimum QT size), the tree node block is forced to be split with the SPLIT_BT_VER mode.

Restrictions on redundant CU splits can be used. The QT with the nested MTT coding block structure can provide a flexible block partitioning structure. Due to the types of splits supported in the MTT, different splitting patterns can potentially result in a same coding block structure. In an example, such as in VVC, certain redundant splitting patterns are disallowed.

Figure 20:
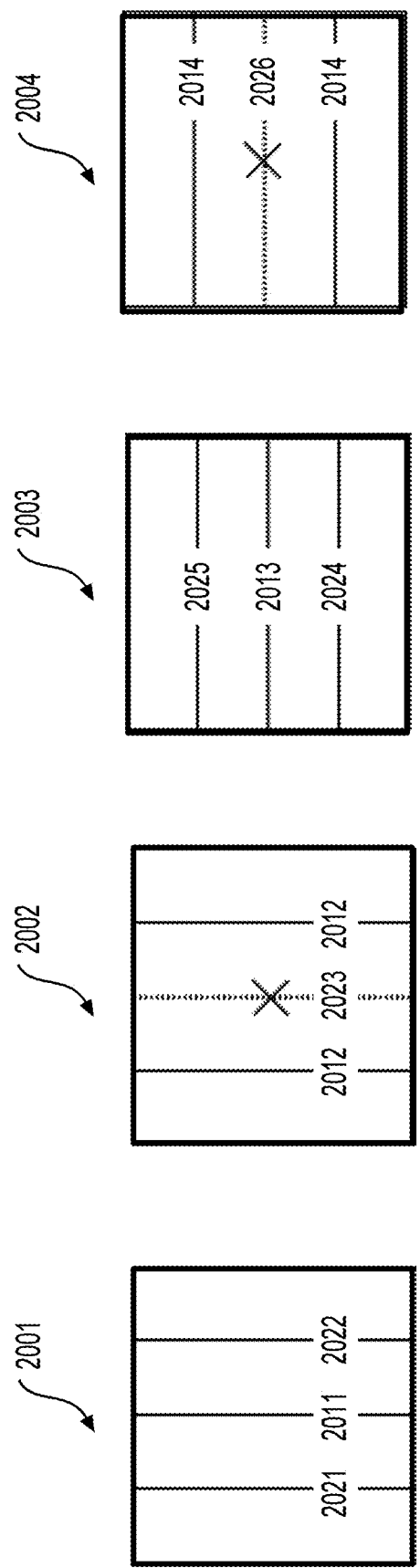
FIG. 20 illustrates examples of redundant splitting patterns of binary tree (BT) splits and TT splits according to embodiments of the disclosure.

FIG. 20 illustrates examples of redundant splitting patterns of BT splits and TT splits according to embodiments of the disclosure. Two levels of consecutive BT splits in a direction can have a same coding block structure as that of a TT split followed by a BT split of a central partition. In the case described above, the BT split (in the given direction) for the central partition of the TT split can be prevented (e.g., disallowed), for example, by a syntax. In an example, the above restriction is applied to CUs in each picture.

In an example, a coding block structure (2001) is generated by two levels of consecutive BT splits in a vertical direction (e.g., a first level BT split (2011) followed by second level BT splits (2021)-(2022)). A coding block structure (2002) can be generated by a vertical TT split (2012) followed by a vertical BT split (2023) of a central partition of the vertical TT split (2012). The coding block structure (2001) can be identical to the coding block structure (2002), and thus the BT split (2023) (in the vertical direction) for the central partition of the TT split (2012) is prevented, for example, by a syntax.

In an example, a coding block structure (2003) is generated by two levels of consecutive BT splits in a horizontal direction (e.g., a first level BT split (2013) followed by second level BT splits (2024)-(2025)). A coding block structure (2004) can be generated by a horizontal TT split (2014) followed by a horizontal BT split (2026) of a central partition of the horizontal TT split (2014). The coding block structure (2003) can be identical to the coding block structure (2004), and thus the BT split (2026) (in the horizontal direction) of the central partition of the TT split (2014) is prevented, for example, by a syntax.

When the splits are prohibited as described above, signaling of the corresponding syntax elements can be modified to account for the prohibited cases. For example, referring to FIG. 20, when a case is identified, e.g., the BT split (2023) or (2026) is prohibited for a CU of a central partition, a syntax element (e.g., mtt_split_cu_binary_flag) which specifies whether the split is a BT split or a TT split is not signaled and is inferred to be equal to 0 by a decoder. Thus, the BT split is prohibited for the CU.

Figure 21:
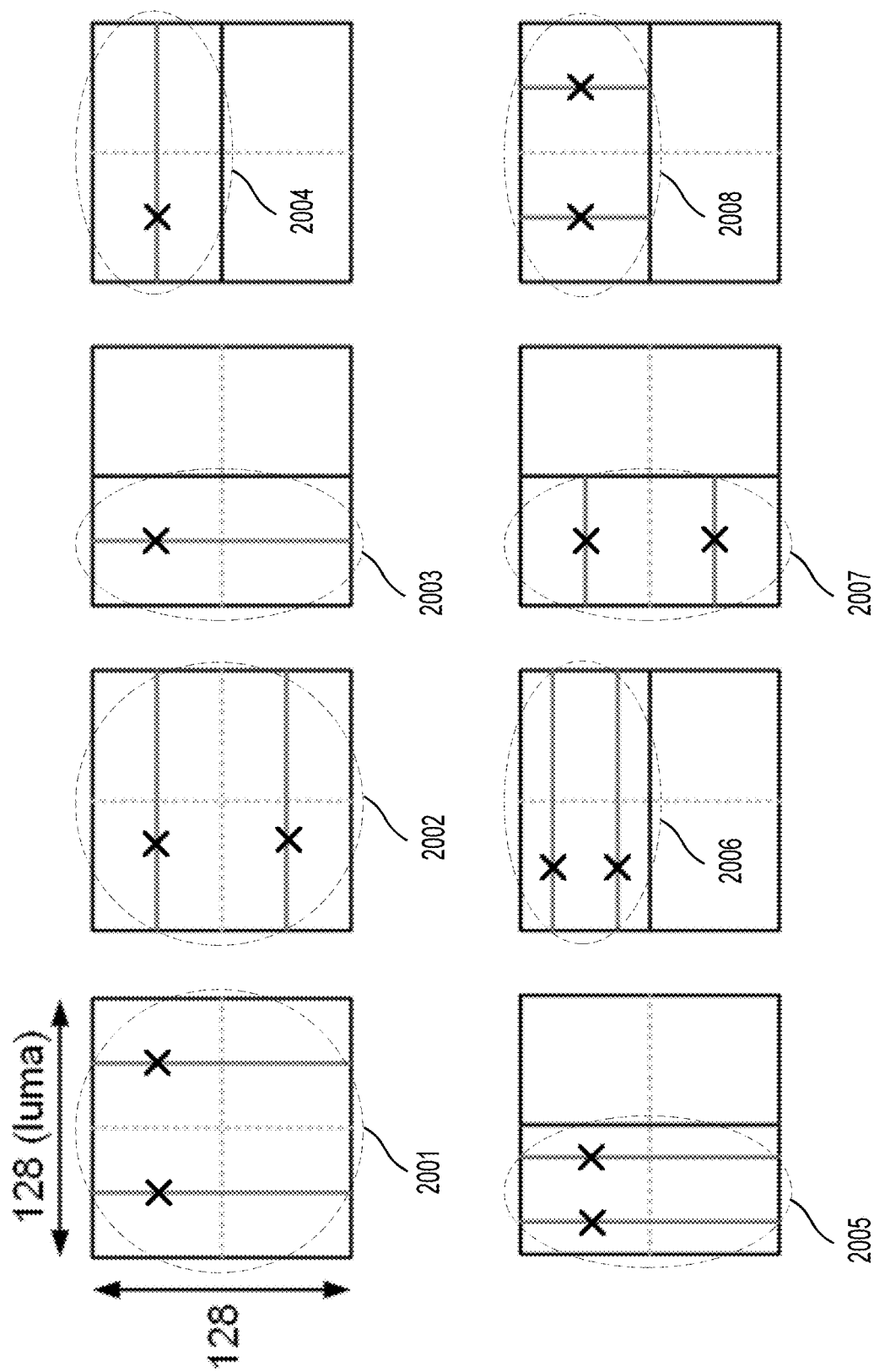
FIG. 21 shows examples of disallowed TT and BT partitioning according to embodiments of the disclosure.

Virtual pipeline data units (VPDUs) can be defined as non-overlapping units in a picture. In hardware decoders, successive VPDUs can be processed by multiple pipeline stages at a same time. A VPDU size can be roughly proportional to a buffer size in most pipeline stages, and thus it is important to maintain a relatively small VPDU size. In various examples, such as in most hardware decoders, the VPDU size can be set to a maximum transform block (TB) size. In some examples, such as in VVC, TT and BT partition may lead to an increase of the VPDU size. In order to keep the VPDU size to be a certain size, such as 64×64 luma samples, the following normative partition restrictions (with exemplary syntax signaling modification) can be applied, as shown in FIG. 21. FIG. 21 shows examples of disallowed TT and BT partitioning according to embodiments of the disclosure.

A TT split is not allowed for a CU with a width, a height, or both the width and the height equal to 128. For example, TT splits (2001), (2002), and (2005)-(2008) are not allowed.

For a 128×N CU with N ≤64 (i.e. a width equal to 128 and a height smaller than 128), a horizontal BT split is not allowed. For example, a horizontal BT split (2004) is not allowed for a 128×64 CU.

For an N×128 CU with N 64 (i.e. a height equal to 128 and a width smaller than 128), a vertical BT split is not allowed. For example, a vertical BT split (2003) is not allowed for a 64×128 CU.

Intra chroma partitioning and prediction restriction are described below. Since a dual tree in an intra picture can apply a different partitioning in a chroma coding tree compared to that of a luma coding tree, the dual tree can introduce longer coding pipeline. The QTBT MinQTSizeC value range, MinBtSizeY, and MinTTSizeY in the chroma coding tree can allow small chroma blocks such as 2×2, 4×2, and 2×4. In an example, MinQTSizeC refers to a minimum allowed chroma QT leaf node size. Thus, practical decoder design can be challenging. Moreover, certain prediction modes, such as a cross-component linear model (CCLM), a planar mode, and an angular mode can use multiplications. In order to alleviate the above challenges, small chroma block sizes (e.g., 2×2, 2×4, and/or 4×2) can be restricted in the dual tree as a partitioning restriction.

In various hardware video encoders and decoders, a processing throughput can decrease when a picture has more small intra blocks, for example, because of sample processing data dependency between neighboring intra blocks. Predictor generation of an intra block can use top and left boundary reconstructed samples from neighboring blocks. Therefore, in an example, intra prediction is to be sequentially processed block by block.

In some examples, such as in HEVC, the smallest intra CU is 8×8 luma samples. A luma component of the smallest intra CU can be further split into four 4×4 luma intra PUs, and chroma components of the smallest intra CU cannot be further split. Therefore, in an example, the hardware processing throughput can be reduced when 4×4 chroma intra blocks or 4×4 luma intra blocks are processed. In some examples, in order to improve throughput, chroma intra CBs smaller than 16 chroma samples may be disallowed by constraining the partitioning of chroma intra CBs. In a single coding tree, a smallest chroma intra prediction unit (SCIPU) can be defined as a coding tree node whose chroma block size is larger than or equal to 16 chroma samples and has at least one child luma block smaller than 64 luma samples. In each SCIPU, all CBs are inter predicted or are non-inter predicted (e.g., intra predicted or intra block copy (IBC)). For a non-inter SCIPU, in an example, chroma CB(s) of the non-inter SCIPU is not further split and a luma CB of the SCIPU is allowed to be further split. Accordingly, the smallest chroma intra CB size can be 16 chroma samples, and thus 2×2, 2×4, and 4×2 chroma CBs can be removed. In addition, in an example, chroma scaling is not applied for a non-inter SCIPU. Here, no additional syntax is signaled, and whether a SCIPU is non-inter predicted can be derived by a prediction mode of a first luma CB in the SCIPU. A type of a SCIPU (an inter SCIPU or a non-inter SCIPU) can be inferred to be the non-inter SCIPU if a current slice is an I-slice or the SCIPU has a 4×4 luma partition in it after being further split one time (because no inter 4×4 is allowed, for example, in VVC); otherwise, the type of the SCIPU can be indicated by a flag before parsing CUs in the SCIPU. In addition, a restriction on a picture size can be considered to avoid 2×2, 2×4, or 4×2 intra chroma blocks at a corner of a picture by considering the picture width and height to be multiple of max (8, MinCbSizeY).

FIG. 22 shows exemplary syntax (2200) related to partitioning and block size in a SPS according to an embodiment of the disclosure. The syntax (2200) can include raw byte sequence payload (RBSP) syntax. The RB SP can refer to a syntax structure including an integer number of bytes that is encapsulated in a network abstraction layer (NAL) unit and is either empty or has the form of a string of data bits including syntax elements followed by an RB SP stop bit and zero or more subsequent bits equal to 0. In an example, the RB SP stop bit is the last non-zero bit in the RB SP.

Partitioning and block size related semantics associated with the syntax (2200) in FIG. 22 can be described below.

A qtbtt_dual_tree_intra_flag equal to 1 can specify that for I slices, each CTU is split into CUs with 64×64 luma samples using an implicit QT split and that the CUs can be the root of two separate coding tree syntax structure for luma and chroma. The qtbtt_dual_tree_intra_flag equal to 0 can specify separate coding_tree syntax structure is not used for I slices. When the qtbtt_dual_tree_intra_flag is not present, it can be inferred to be equal to 0.

A variable log 2_min_luma_coding_block_size_minus2 plus 2 (i.e., log 2_min_luma_coding_block_size_minus2+2) can specify the minimum luma coding block size. A value range of log2_min_luma_coding_block_size_minus2 can be in a range of 0 to log2_ctu_size_minus5+3, inclusive.

The variables MinCbLog2SizeY, MinCbSizeY, IbcBufWidthY, IbcBufWidthC and Vsize can be derived as follows:

$$MinCb\ Log2SizeY = log2\_min\_luma\_coding\_block\_size\_minus2+2 \quad (1)$$

$$MinCbSizeY = 1 << MinCb\ Log2SizeY \quad (2)$$

$$IbcBufWidthY = 256*128/CtbSizeY \quad (3)$$

$$IbcBufWidthC = IbcBufWidthY/SubWidthC \quad (4)$$

$$VSize = Min(64, CtbSizeY) \quad (5)$$

The value of MinCbSizeY can be less than or equal to VSize.

The variables CtbWidthC and CtbHeightC, which specify the width and height, respectively, of the array for each chroma CTB, can be derived as follows:

If chroma format idc is equal to 0 (monochrome) or separate_colour_plane_flag is equal to 1, CtbWidthC and CtbHeightC are both equal to 0.

Otherwise, CtbWidthC and CtbHeightC are derived as follows:

$$Ctb\text{Width}C = Ctb\text{Size}Y/\text{SubWidth}C \quad (6)$$

$$Ctb\text{Height}C = Ctb\text{Size}Y/\text{SubHeight}C \quad (7)$$

For a log2BlockWidth ranging from 0 to 4 and for a log2BlockHeight ranging from 0 to 4, inclusive, an up-right diagonal and raster scan order array initialization process can be invoked with 1<<log2BlockWidth and 1<<log2BlockHeight as inputs, and an output can be assigned to DiagScanOrder[log2BlockWidth][log2BlockHeight] and Raster2DiagScanPos[log2BlockWidth][log2BlockHeight].

For the log2BlockWidth ranging from 0 to 6 and for the log2BlockHeight ranging from 0 to 6, inclusive, a horizontal and vertical traverse scan order array initialization process can be invoked with 1<<log2BlockWidth and 1<<log2BlockHeight as inputs, and the output can be assigned to HorTrayScanOrder[log2BlockWidth][log2BlockHeight] and VerTrayScanOrder[log2BlockWidth][log2BlockHeight].

A partition_constraints_override_enabled_flag equal to 1 can specify the presence of a partition_constraints_override_flag in picture headers (PHs) referring to the SPS. The partition_constraints_override_enabled_flag equal to 0 can specify the absence of the partition_constraints_override_flag in PHs referring to the SPS.

A sps_log2_diff_min_qt_min_cb_intra_slice_luma can specify the default difference between the base 2 logarithm of the minimum size in luma samples of a luma leaf block resulting from QT splitting of a CTU and the base 2 logarithm of the minimum coding block size in luma samples for luma CUs in slices with a slice_type equal to 2 (indicating I slices) referring to the SPS. When a partition_constraints_override_enabled_flag is equal to 1, the default difference can be overridden by pic_log2_diff_min_qt_min_cb_luma present in PHs referring to the SPS. The value of sps_log2_diff_min_qt_min_cb_intra_slice_luma can be in a range of 0 to CtbLog2SizeY−MinCbLog2SizeY, inclusive. The base 2 logarithm of the minimum size in luma samples of a luma leaf block resulting from QT splitting of a CTU can be derived as follows:

$$\text{Min}Qt\ \text{Log2SizeIntra}Y = \\ sps\_\text{log2\_diff\_min\_}qt\_\text{min\_}cb\_\text{intra\_slice\_luma} + \\ \text{Min}Cb\ \text{Log2Size}Y \quad (8)$$

A sps_log2_diff_min_qt_min_cb_inter_slice can specify the default difference between the base 2 logarithm of the minimum size in luma samples of a luma leaf block resulting from QT splitting of a CTU and the base 2 logarithm of the minimum luma coding block size in luma samples for luma CUs in slices with slice_type equal to 0 (indicating B slices) or 1 (indicating P slices) referring to the SPS. When partition_constraints_override_enabled_flag is equal to 1, the default difference can be overridden by pic_log2_diff_min_qt_min_cb_luma present in PHs referring to the SPS. The value of sps_log2_diff_min_qt_min_cb_inter_slice can be in a range of 0 to CtbLog2SizeY−MinCbLog2SizeY, inclusive. The base 2 logarithm of the minimum size in luma samples of a luma leaf block resulting from QT splitting of a CTU can be derived as follows:

$$\text{Min}Qt\ \text{Log2SizeInter}Y = \\ sps\_\text{log2\_diff\_min\_}qt\_\text{min\_}cb\_\text{inter\_slice} + \\ \text{Min}Cb\ \text{Log2Size}Y \quad (9)$$

A sps_max_mtt_hierarchy_depth_inter_slice can specify the default maximum hierarchy depth for coding units resulting from MTT splitting of a QT leaf in slices with slice_type equal to 0 (indicating B slices) or 1 (indicating P slices) referring to the SPS. When partition_constraints_override_enabled_flag is equal to 1, the default maximum hierarchy depth can be overridden by pic_max_mtt_hierarchy_depth_inter_slice present in PHs referring to the SPS. The value of sps_max_mtt_hierarchy_depth_inter_slice can be in a range of 0 to 2×(CtbLog2SizeY−MinCbLog2SizeY), inclusive.

A sps_max_mtt_hierarchy_depth_intra_slice_luma can specify the default maximum hierarchy depth for coding units resulting from MTT splitting of a QT leaf in slices with slice_type equal to 2 (indicating I slices) referring to the SPS. When partition_constraints_override_enabled_flag is equal to 1, the default maximum hierarchy depth can be overridden by pic_max_mtt_hierarchy_depth_intra_slice_luma present in PHs referring to the SPS. The value of sps_max_mtt_hierarchy_depth_intra_slice_luma can be in a range of 0 to 2×(CtbLog2SizeY−MinCbLog2SizeY), inclusive.

A sps_log2_diff_max_bt_min_qt_intra_slice_luma can specify the default difference between the base 2 logarithm of the maximum size (width or height) in luma samples of a luma coding block that can be split using a binary split and the minimum size (width or height) in luma samples of a luma leaf block resulting from QT splitting of a CTU in slices with slice_type equal to 2 (indicating I slices) referring to the SPS. When partition_constraints_override_enabled_flag is equal to 1, the default difference can be overridden by pic_log2_diff_max_bt_min_qt_luma present in PHs referring to the SPS. The value of sps_log2_diff_max_bt_min_qt_intra_slice_luma can be in a range of 0 to CtbLog2SizeY−MinQtLog2SizeIntraY, inclusive. When sps_log2_diff_max_bt_min_qt_intra_slice_luma is not present, the value of sps_log2_diff_max_bt_min_qt_intra_slice_luma can be inferred to be equal to 0.

A sps_log2_diff_max_tt_min_qt_intra_slice_luma can specify the default difference between the base 2 logarithm of the maximum size (width or height) in luma samples of a luma coding block that can be split using a ternary split and the minimum size (width or height) in luma samples of a luma leaf block resulting from QT splitting of a CTU in slices with slice_type equal to 2 (indicating I slices) referring to the SPS. When partition_constraints_override_enabled_flag is equal to 1, the default difference can be overridden by pic_log2_diff_max_tt_min_qt_luma present in PHs referring to the SPS. The value of sps_log2_diff_max_tt_min_qt_intra_slice_luma can be in a range of 0 to CtbLog2SizeY−MinQtLog2SizeIntraY, inclusive. When sps_log2_diff_max_tt_min_qt_intra_slice_luma is not present, the value of sps_log2_diff_max_tt_min_qt_intra_slice_luma can be inferred to be equal to 0.

A sps_log2_diff_max_bt_min_qt_inter_slice can specify the default difference between the base 2 logarithm of the maximum size (width or height) in luma samples of a luma coding block that can be split using a binary split and the minimum size (width or height) in luma samples of a luma leaf block resulting from QT splitting of a CTU in slices with slice_type equal to 0 (indicating B slices) or 1 (indicating P slices) referring to the SPS. When partition_constraints_override_enabled_flag is equal to 1, the default difference can be overridden by pic_log2_diff_max_bt_min_qt_luma present in PHs referring to the SPS. The value of sps_log2_diff_max_bt_min_qt_inter_slice can be in a range of 0 to CtbLog2SizeY−MinQtLog2SizeInterY, inclusive. When sps_log2_diff_max_bt_min_qt_inter_slice is not present, the value of sps_log2_diff_max_bt_min_qt_inter_slice can be inferred to be equal to 0.

A sps_log2_diff_max_tt_min_qt_inter_slice can specify the default difference between the base 2 logarithm of the maximum size (width or height) in luma samples of a luma coding block that can be split using a ternary split and the minimum size (width or height) in luma samples of a luma leaf block resulting from QT splitting of a CTU in slices with slice_type equal to 0 (indicating B slices) or 1 (indicating P slices) referring to the SPS. When partition_constraints_override_enabled_flag is equal to 1, the default difference can be overridden by pic_log2_diff_max_tt_min_qt_luma present in PHs referring to the SPS. The value of sps_log2_diff_max_tt_min_qt_inter_slice can be in a range of 0 to CtbLog2SizeY−MinQtLog2SizeInterY, inclusive. When sps_log2_diff_max_tt_min_qt_inter_slice is not present, the value of sps_log2_diff_max_tt_min_qt_inter_slice can be inferred to be equal to 0.

A sps_log2_diff_min_qt_min_cb_intra_slice_chroma can specify the default difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with slice_type equal to 2 (indicating I slices) referring to the SPS. When partition_constraints_override_enabled_flag is equal to 1, the default difference can be overridden by pic_log2_diff_min_qt_min_cb_chroma present in PHs referring to the SPS. The value of sps_log2_diff_min_qt_min_cb_intra_slice_chroma can be in a range of 0 to CtbLog2SizeY−MinCbLog2SizeY, inclusive. When not present, the value of sps_log2_diff_min_qt_min_cb_intra_slice_chroma can be inferred to be equal to 0. The base 2 logarithm of the minimum size in luma samples of a chroma leaf block resulting from QT splitting of a CTU with treeType equal to DUAL_TREE_CHROMA can be derived as follows:

$$\text{Min}Qt\text{ Log2SizeIntraC} = \text{sps\_log2\_diff\_min\_}qt\text{\_min\_}cb\text{\_intra\_slice\_chroma} + \text{Min}Cb\text{ Log2Size}Y \quad (10)$$

A sps_max_mtt_hierarchy_depth_intra_slice_chroma can specify the default maximum hierarchy depth for chroma coding units resulting from multi-type tree splitting of a chroma quadtree leaf with treeType equal to DUAL_TREE_CHROMA in slices with slice_type equal to 2 (indicating I slices) referring to the SPS. When partition_constraints_override_enabled_flag is equal to 1, the default maximum hierarchy depth can be overridden by pic_max_mtt_hierarchy_depth_chroma present in PHs referring to the SPS. The value of sps_max_mtt_hierarchy_depth_intra_slice_chroma can be in a range of 0 to 2×(CtbLog2SizeY−MinCbLog2SizeY), inclusive. When not present, the value of sps_max_mtt_hierarchy_depth_intra_slice_chroma can be inferred to be equal to 0.

A sps_log2_diff_max_bt_min_qt_intra_slice_chroma can specify the default difference between the base 2 logarithm of the maximum size (width or height) in luma samples of a chroma coding block that can be split using a binary split and the minimum size (width or height) in luma samples of a chroma leaf block resulting from QT splitting of a chroma CTU with treeType equal to DUAL_TREE_CHROMA in slices with slice_type equal to 2 (indicating I slices) referring to the SPS. When partition_constraints_override_enabled_flag is equal to 1, the default difference can be overridden by pic_log2_diff_max_bt_min_qt_chroma present in PHs referring to the SPS. The value of sps_log2_diff_max_bt_min_qt_intra_slice_chroma can be in a range of 0 to CtbLog2SizeY−MinQtLog2SizeIntraC, inclusive. When sps_log2_diff_max_bt_min_qt_intra_slice_chroma is not present, the value of sps_log2_diff_max_bt_min_qt_intra_slice_chroma can be inferred to be equal to 0.

A sps_log2_diff_max_tt_min_qt_intra_slice_chroma can specify the default difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in slices with slice_type equal to 2 (indicating I slices) referring to the SPS. When partition_constraints_override_enabled_flag is equal to 1, the default difference can be overridden by pic_log2_diff_max_tt_min_qt_chroma present in PHs referring to the SPS. The value of sps_log2_diff_max_tt_min_qt_intra_slice_chroma can be in the range of 0 to CtbLog2SizeY−MinQtLog2SizeIntraC, inclusive. When sps_log2_diff_max_tt_min_qt_intra_slice_chroma is not present, the value of sps_log2_diff_max_tt_min_qt_intra_slice_chroma can be inferred to be equal to 0.

A sps_max_luma_transform_size_64_flag equal to 1 can specify that the maximum transform size in luma samples is equal to 64. The sps_max_luma_transform_size_64_flag equal to 0 can specify that the maximum transform size in luma samples is equal to 32. When CtbSizeY is less than 64, the value of sps_max_luma_transform_size_64_flag can be equal to 0.

The variables MinTbLog2SizeY, MaxTbLog2SizeY, MinTbSizeY, and MaxTbSizeY can be derived as follows:

$$\text{MinTbLog2Size}Y=2 \quad (11)$$

$$\text{MaxTbLog2Size}Y = \text{sps\_max\_luma\_transform\_size\_64\_flag? 6:5} \quad (12)$$

$$\text{MinTbSize}Y=1<<\text{Min}Tb\text{ Log2Size}Y \quad (13)$$

$$\text{MaxTbSize}Y=1<<\text{Max}Tb\text{ Log2Size}Y \quad (14)$$

A pic_log2_diff_min_qt_min_cb_intra_slice_chroma can specify the difference between the base 2 logarithm of the minimum size in luma samples of a chroma leaf block resulting from QT splitting of a chroma CTU with treeType equal to DUAL_TREE_CHROMA and the base 2 logarithm of the minimum coding block size in luma samples for chroma CUs with treeType equal to DUAL_TREE_CHROMA in slices with slice_type equal to 2 (indicating I slices) associated with the PH. The value of pic_log2_diff_min_qt_min_cb_intra_slice_chroma can be in a range of 0 to CtbLog2SizeY−MinCbLog2SizeY, inclusive. When not present, the value of pic_log2_diff_min_qt_min_cb_intra_slice_chroma can be inferred to be equal to sps_log2_diff_min_qt_min_cb_intra_slice_chroma.

A slice_type can specify the coding type of the slice according to Table 3 in FIG. 23. For example, the slice_type of 0-2 correspond to a B slice, a P slice, and a I slice respectively.

When a nal_unit_type is a value of the nal_unit_type in a range of IDR_W_RADL to CRA_NUT, inclusive, and the current picture is the first picture in an access unit, the slice_type can be equal to 2.

The variables MinQtLog2SizeY, MinQtLog2SizeC, MinQtSizeY, MinQtSizeC, MaxBtSizeY, MaxBtSizeC, MinBtSizeY, MaxTtSizeY, MaxTtSizeC, MinTtSizeY, MaxMttDepthY and MaxMttDepthC can be derived as follows:

$$\text{MinQtSize}Y = 1 << \text{Min}Qt\text{ Log2Size}Y \quad (15)$$

$$\text{MinQtSize}C = 1 << \text{Min}Qt\text{ Log2Size}C \quad (16)$$

$$\text{Min}Bt\text{Size}Y = 1 << \text{Min}Cb\text{ Log2Size}Y \quad (17)$$

$$\text{Min}Tt\text{Size}Y = 1 << \text{Min}Cb\text{ Log2Size}Y \quad (18)$$

If the slice_type is equal to 2 (an I slice), $$\text{Min}Qt\text{ Log2Size}Y = \text{Min}Cb\text{ Log2Size}Y + \text{pic\_log2\_diff\_min}\_qt\_\text{min}\_cb\_\text{intra\_slice\_luma} \quad (19)$$

$$\text{Min}Qt\text{ Log2Size}C = \text{Min}Cb\text{ Log2Size}C + \text{pic\_log2\_diff\_min}\_qt\_\text{min}\_cb\_\text{intra\_slice\_chroma} \quad (20)$$

$$\text{Max}Bt\text{Size}Y = 1 << (\text{Min}Qt\text{ Log2Size}Y + \text{pic\_log2\_diff\_max}\_bt\_\text{min}\_qt\_\text{intra\_slice\_luma}) \quad (21)$$

$$\text{Max}Bt\text{Size}C = 1 << (\text{Min}Qt\text{ Log2Size}C + \text{pic\_log2\_diff\_max}\_bt\_\text{min}\_qt\_\text{intra\_slice\_chroma}) \quad (22)$$

$$\text{Max}Tt\text{Size}Y = 1 << (\text{Min}Qt\text{ Log2Size}Y + \text{pic\_log2\_diff\_max}\_tt\_\text{min}\_qt\_\text{intra\_slice\_luma}) \quad (23)$$

$$\text{Max}Tt\text{Size}C = 1 << (\text{Min}Qt\text{ Log2Size}C + \text{pic\_log2\_diff\_max}\_tt\_\text{min}\_qt\_\text{intra\_slice\_chroma}) \quad (24)$$

$$\text{Max}Mtt\text{Depth}Y = \text{pic\_max}\_mtt\_\text{hierarchy\_depth\_intra\_slice\_luma} \quad (25)$$

$$\text{Max}Mtt\text{Depth}C = \text{pic\_max}\_mtt\_\text{hierarchy\_depth\_intra\_slice\_chroma} \quad (26)$$

$$\text{CuQpDeltaSubdiv} = \text{pic\_cu\_qp\_delta\_subdiv\_intra\_slice} \quad (27)$$

$$\text{CuChromaQpOffsetSubdiv} = \text{pic\_cu\_chroma\_qp\_offset\_subdiv\_intra\_slice} \quad (28)$$

Otherwise (the slice_type is equal to 0 (a B slice) or 1 (a P slice)), $$\text{Min}Qt\text{ Log2Size}Y = \text{Min}Cb\text{ Log2Size}Y + \text{pic\_log2\_diff\_min}\_qt\_\text{min}\_cb\_\text{inter\_slice} \quad (29)$$

$$\text{Min}Qt\text{ Log2Size}C = \text{Min}Cb\text{ Log2Size}C + \text{pic\_log2\_diff\_min}\_qt\_\text{min}\_cb\_\text{inter\_slice} \quad (30)$$

$$\text{Max}Bt\text{Size}Y = 1 << (\text{Min}Qt\text{ Log2Size}Y + \text{pic\_log2\_diff\_max}\_bt\_\text{min}\_qt\_\text{inter\_slice}) \quad (31)$$

$$\text{Max}Bt\text{Size}C = 1 << (\text{Min}Qt\text{ Log2Size}C + \text{pic\_log2\_diff\_max}\_bt\_\text{min}\_qt\_\text{inter\_slice}) \quad (32)$$

$$\text{Max}Tt\text{Size}Y = 1 << (\text{Min}Qt\text{ Log2Size}Y + \text{pic\_log2\_diff\_max}\_tt\_\text{min}\_qt\_\text{inter\_slice}) \quad (33)$$

$$\text{Max}Tt\text{Size}C = 1 << (\text{Min}Qt\text{ Log2Size}C + \text{pic\_log2\_diff\_max}\_tt\_\text{min}\_qt\_\text{inter\_slice}) \quad (34)$$

$$\text{MaxMttDepth}Y = \text{pic\_max\_mtt\_hierarchy\_depth\_inter\_slice} \quad (35)$$

$$\text{MaxMttDepth}C = \text{pic\_max\_mtt\_hierarchy\_depth\_inter\_slice} \quad (36)$$

$$\text{CuQpDeltaSubdiv} = \text{pic\_cu\_qp\_delta\_subdiv\_inter\_slice} \quad (37)$$

$$\text{CuChromaQpOffsetSubdiv} = \text{pic\_cu\_chroma\_qp\_offset\_subdiv\_inter\_slice} \quad (38)$$

Chroma intra prediction can be disabled for certain chroma block sizes, such as a size of 2×N.

In an embodiment, 2×N chroma intra blocks in both a dual tree and a single tree can be removed as described below. In the dual tree, a 2×N intra chroma can be restricted by disabling certain splits. For example, the binary tree and ternary tree splits are prohibited for blocks with a width of 4 and 8, respectively.

In order to remove 2×N in the single tree, two restrictions can be used including an extension of a local dual tree and a restriction of combined inter merge/intra prediction (CIIP) for chroma 2×N.

In the first restriction, when a partition width is 4 and the split is a binary vertical split or the width is 8 and the split is a ternary vertical split, the chroma component can be treated as a SCIPU. Following the principle restriction of a SCIPU, the chroma components are not split in intra-SCIPU (all luma blocks are encoded using non-inter mode and the non-split chroma block is coded using intra mode). For inter-SCIPU (all luma and chroma blocks are encoded using inter mode), the split of the chroma components can be inherited from the luma component.

In the second restriction, in an example, for 4×N CIIP blocks, the CIIP is only used for the luma component while only inter prediction is used for the chroma components.

The above restrictions can ensure that the width of intra chroma blocks is larger than or equal to 4, and thus a 2×N pixels intra process can be removed. The restrictions can make the implementation of the video codec friendly for hardware implementations in terms of pipeline management An example of partitioning availability related processes, such as in VVC, is described as below.

In an embodiment, an allowed quad split process is described below. Inputs to the allowed quad split process can include:
a) a coding block size (or cbSize) in luma samples,
b) a MTT depth (or mttDepth),
c) a variable tree type (or treeType) specifying whether a single tree (or
SINGLE_TREE) or a dual tree is used to partition the coding tree node and, when a dual tree is used, whether the luma (DUAL_TREE_LUMA) or chroma components (DUAL_TREE_CHROMA) are currently processed,
d) a variable mode type (also referred to as a prediction mode type, e.g., modeType) specifying whether an intra mode (or intra prediction mode, MODE_INTRA), an IBC mode (or MODE_IBC), and an inter coding mode can be used (MODE_TYPE_ALL), or whether only the intra and IBC coding modes can be used (MODE_TYPE_INTRA), or whether only inter coding modes can be used (MODE_TYPE_INTER) for coding units inside the coding tree node. In an example, MODE_TYPE_ALL indicates that the intra, IBC, and inter coding modes can be used.

The coding block size (or cbSize) in luma samples can represent a block size of the chroma coding block (or chroma block) with luma samples. Thus, the block size of the chroma coding block in chroma samples can be determined based on the coding block size in luma samples (or cbSize) and a corresponding chroma subsampling ratio, such as the chroma horizontal subsampling ratio or the chroma subsampling ratio in a horizontal direction (e.g., SubWidthC). For example, for the chroma format 4:2:0, the coding block size (or cbSize) in luma samples is 16, and thus the block size of the chroma coding block is 16 when represented using luma samples as a unit or 8 when represented using chroma samples as the unit.

In an example, the coding block size cbSize is set equal to a width of the coding block size (cbWidth) in luma samples. For example, for the chroma format 4:2:2, the width of the coding block size in luma samples is 16 luma samples and the chroma horizontal subsampling ratio (SubWidthC) is 2, and thus the block size of the chroma coding block can be 16 in luma sample or 16/2 (or 8) in chroma samples. In addition, for the chroma format 4:2:2, the height of the coding block size in luma samples is 16 luma samples and the chroma vertical subsampling ratio (SubHeightC) is 1, and thus the height of the chroma coding block can be 16 in luma samples or 16 in chroma samples.

An output of the allowed quad split process can include the variable allowSplitQt indicating whether the QT split is allowed (e.g., allowSplitQt being TRUE) or disallowed (e.g., allowSplitQt being FALSE). The variable allowSplitQt can be derived as follows:

If one or more of the following conditions (also referred to as conditions for QT splitting) are true, the variable allowSplitQt can be set equal to FALSE, and the QT splitting (or the QT split) is not allowed:
  (a) treeType is equal to SINGLE_TREE or DUAL_TREE_LUMA and cbSize is less than or equal to MinQtSizeY
  (b) treeType is equal to DUAL_TREE_CHROMA and cbSize/SubWidthC is less than or equal to MinQtSizeC
  (c) mttDepth is not equal to 0
  (d) treeType is equal to DUAL_TREE_CHROMA and (cbSize/SubWidthC) is less than or equal to 4
  (e) treeType is equal to DUAL_TREE_CHROMA and modeType is equal to MODE_TYPE_INTRA Otherwise, the allowSplitQt can be set equal to TRUE. Thus, the QT splitting (or the QT split) can be allowed.

In various examples, certain conditions, such as the conditions (b), (d), and (e) above include that the treeType is equal to DUAL_TREE_CHROMA, and thus the conditions (b), (d), and (e) can be true when QT splitting is applied to a chroma block and cannot be true when QT splitting is applied to a luma block. Accordingly, the conditions (b), (d), and (e) for QT splitting can be referred to as the conditions for the chroma QT splitting (or the chroma QT split).

One or more of the conditions (a)-(e) can be modified and/or omitted. Additional condition(s) can be added to the conditions (a)-(e).

In an example, coding tree semantics include a variable allowSplitQt that can be derived as follows: the allowed quad split process can be invoked with the coding block size cbSize set equal to cbWidth (e.g., in luma samples), the current multi-type tree depth mttDepth, treeTypeCurr and modeTypeCurr as inputs, and the output can be assigned to allowSplitQt.

In an embodiment, an allowed binary split process is described below. Inputs to the allowed binary split process can include:
  a) a binary split mode (or btSplit),
  b) a coding block width (or cbWidth) in luma samples,
  c) a coding block height (or cbHeight) in luma samples,
  d) a location (x0, y0) of the top-left luma sample of the considered coding block relative to the top-left luma sample of the picture,
  e) a multi-type tree depth (or mttDepth),
  f) a maximum multi-type tree depth with offset (or maxMttDepth),
  g) a maximum binary tree size (or maxBtSize),
  h) a minimum QT size (or minQtSize),
  i) a partition index (or partIdx),
  j) a variable tree type (or treeType) specifying whether a single tree (SINGLE_TREE) or a dual tree is used to partition the coding tree node and, when a dual tree is used, whether the luma (DUAL_TREE_LUMA) or chroma components (DUAL_TREE_CHROMA) are currently processed,
  k) a variable mode type (or modeType) specifying whether intra (MODE_INTRA), IBC (MODE_IBC), and inter coding modes can be used (MODE_TYPE_ALL), or whether only intra and IBC coding modes can be used (MODE_TYPE_INTRA), or whether only inter coding modes can be used (MODE_TYPE_INTER) for coding units inside the coding tree node.

An output of the allowed binary split process can include the variable the allowBtSplit.

In an example, variables parallelTtSplit and cbSize are derived based on the variable btSplit, as shown in Table 4 (FIG. 24).

The variable allowBtSplit can be derived as follows:
  If one or more of the following conditions are true, the variable allowBtSplit can be set equal to FALSE:
    cbSize is less than or equal to MinBtSizeY
    cbWidth is greater than maxBtSize
    cbHeight is greater than maxBtSize
    mttDepth is greater than or equal to maxMttDepth
    treeType is equal to DUAL_TREE_CHROMA and (cbWidth/SubWidthC)×(cbHeight/SubHeightC) is less than or equal to 16
    treeType is equal to DUAL_TREE_CHROMA and (cbWidth/SubWidthC) is equal to 4 and btSplit is equal to SPLIT_BT_VER
    treeType is equal to DUAL_TREE_CHROMA and modeType is equal to MODE_TYPE_INTRA
    cbWidth×cbHeight is equal to 32 and modeType is equal to MODE_TYPE INTER
  Otherwise, if all of the following conditions are true, the variable eallowBtSplit can be set equal to FALSE
    btSplit is equal to SPLIT_BT_VER
    y0+cbHeight is greater than pic_height_in_luma_samples
  Otherwise, if all of the following conditions are true, the variable allowBtSplit can be set equal to FALSE
    btSplit is equal to SPLIT_BT_VER
    cbHeight is greater than 64
    x0+cbWidth is greater than pic_width_in_luma_samples
  Otherwise, if all of the following conditions are true, the variable allowBtSplit can be set equal to FALSE
    btSplit is equal to SPLIT_BT_HOR
    cbWidth is greater than 64
    y0+cbHeight is greater than pic_height_in_luma_samples
  Otherwise, if all of the following conditions are true, the variable allowBtSplit can be set equal to FALSE
    x0+cbWidth is greater than pic_width_in_luma_samples y0+cbHeight is greater than pic_height_in_luma_samples cbWidth is greater than minQtSize Otherwise, if all of the following conditions are true, the variable allowBtSplit can be set equal to FALSE
btSplit is equal to SPLIT_BT_HOR
x0+cbWidth is greater than pic_width_in_luma_samples
y0+cbHeight is less than or equal to pic_height_in_luma_samples Otherwise, if all of the following conditions are true, the variable allowBtSplit can be set equal to FALSE:
mttDepth is greater than 0
partIdx is equal to 1
MttSplitMode[x0][y0][mttDepth−1] is equal to parallelTtSplit Otherwise, if all of the following conditions are true, the variable allowBtSplit can be set equal to FALSE
btSplit is equal to SPLIT_BT_VER
cbWidth is less than or equal to 64
cbHeight is greater than 64

Otherwise, if all of the following conditions are true, the variable allowBtSplit can be set equal to FALSE
btSplit is equal to SPLIT_BT_HOR
cbWidth is greater than 64
cbHeight is less than or equal to 64

Otherwise, the variable allowBtSplit can be set equal to TRUE.

In an embodiment, an allowed ternary split process is described below. Inputs to the allowed ternary split process can include:
a) a ternary split mode (or ttSplit),
b) a coding block width (or cbWidth) in luma samples,
c) a coding block height (or cbHeight) in luma samples,
d) a location (x0, y0) of the top-left luma sample of the considered coding block relative to the top-left luma sample of the picture,
e) a multi-type tree depth (or mttDepth)
f) a maximum multi-type tree depth with offset (or maxMttDepth),
g) a maximum ternary tree size (or maxTtSize),
h) a variable tree type (or treeType) specifying whether a single tree (SINGLE_TREE) or a dual tree is used to partition the coding tree node and, when a dual tree is used, whether the luma (DUAL_TREE_LUMA) or chroma components (DUAL_TREE_CHROMA) are currently processed,
i) a variable mode type (or modeType) specifying whether intra (MODE_INTRA), IBC (MODE_IBC), and inter coding modes can be used (MODE_TYPE_ALL), or whether only intra and IBC coding modes can be used (MODE_TYPE_INTRA), or whether only inter coding modes can be used (MODE_TYPE_INTER) for coding units inside the coding tree node.

Output of the allowed ternary split process can include the variable allowTtSplit.

In an example, the variable cbSize is derived based on the variable ttSplit, as shown in Table 5 (FIG. 25).

The variable allowTtSplit can be derived as follows:
If one or more of the following conditions are true, the variable allowTtSplit can be set equal to FALSE:
cbSize is less than or equal to 2×MinTtSizeY
cbWidth is greater than Min(64, maxTtSize)
cbHeight is greater than Min(64, maxTtSize)
mttDepth is greater than or equal to maxMttDepth
x0+cbWidth is greater than pic_width_in_luma_samples y0+cbHeight is greater than pic_height_in_luma_samples
treeType is equal to DUAL_TREE_CHROMA and (cbWidth/SubWidthC)×(cbHeight/SubHeightC) is less than or equal to 32
treeType is equal to DUAL_TREE_CHROMA and (cbWidth/SubWidthC) is equal to 8 and ttSplit is equal to SPLIT_TT_VER
treeType is equal to DUAL_TREE_CHROMA and modeType is equal to MODE_TYPE_INTRA
cbWidth×cbHeight is equal to 64 and modeType is equal to MODE_TYPE_INTER Otherwise, the variable allowTtSplit can be set equal to TRUE.

Derivation process for neighboring block availability can be described as below.

Inputs to the derivation process for the neighboring block availability can include:
a) the luma location (xCurr, yCurr) of the top-left sample of the current block relative to the top-left luma sample of the current picture,
b) the luma location (xNbY, yNbY) covered by a neighboring block relative to the top-left luma sample of the current picture,
c) the variable checkPredModeY specifying whether availability depends on the prediction mode,
d) the variable cIdx specifying the color component of the current block.

An output of the derivation process can include the availability of the neighboring block covering the location (xNbY, yNbY), denoted as availableN. The neighboring block availability (or availableN) can be derived as follows:
If one or more of the following conditions are true, availableN is set equal to FALSE:
xNbY is less than 0.
yNbY is less than 0.
xNbY is greater than or equal to pic_width_in_luma_samples.
yNbY is greater than or equal to pic_height_in_luma_samples.
IsAvailable[cIdx][xNbY][yNbY] is equal to FALSE.
The neighboring block is contained in a different slice than the current block.
The neighboring block is contained in a different tile than the current block.
An entropy_coding_sync_enabled_flag is equal to 1 and (xNbY >>CtbLog2SizeY) is greater than or equal to (xCurr >>CtbLog2SizeY)+1.

Otherwise, the variable availableN can be set equal to TRUE.

When all of the following conditions are true, the variable availableN can be set equal to FALSE:
checkPredModeY is equal to TRUE.
CuPredMode[0][xNbY][yNbY] is not equal to CuPredMode[0][xCurr][yCurr].

As described above, one (i.e., the condition (b)) of the conditions for QT splitting includes checking whether cbSize/SubWidthC is less than or equal to the minimum allowed chroma QT leaf node size (e.g., MinQtSizeC). cbSize can be the coding block size of the chroma block in luma samples, and SubWidthC can be the chroma horizontal subsampling factor (or the chroma subsampling factor for a horizontal direction). In some examples, cbSize/SubWidthC corresponds to a width of the chroma block in chroma samples. When the chroma format is 4:2:2, the subsampling on the horizontal direction and the vertical direction can be different, and thus the width of the chroma block in chroma samples can be less than a height of the chroma block in chroma samples. Thus, using cbSize/SubWidthC being less than or equal to MinQtSizeC as a condition to disable (or disallow) QT splitting can have a higher chance of disabling a chroma QT split, for example, when cbSize is equal to MinQtSizeC and in some examples can lower coding performance on chroma components.

The condition (b) for the chroma QT split described above can be modified to allow more QT splits. According to aspects of the disclosure, the modified condition (b) can compare a chroma block height (or a height of the chroma block) with the minimum allowed chroma QT leaf node size (also referred to as the minimum allowed chroma block size for QT splitting) (MinQtSizeC).

According to aspects of the disclosure, the allowed quad split process described above can be modified by modifying the condition (b) while other conditions (e.g., the conditions (a) and (c)-(e) remain unchanged. The modified condition (e.g., denoted as the condition b') can be described as:
- (b') treeType is equal to DUAL_TREE_CHROMA and cbSize/SubHeightC is less than or equal to MinQtSizeC.

The inputs of the allowed quad split process can remain the same as described above while derivation of the output (e.g., the variable allowSplitQt) of the allowed quad split process can be updated as below.

If one or more of the following conditions are true, the variable allowSplitQt can be set equal to FALSE, and the QT splitting is not allowed:
- (a) treeType is equal to SINGLE_TREE or DUAL_TREE_LUMA and cbSize is less than or equal to MinQtSizeY
- (b') treeType is equal to DUAL_TREE_CHROMA and cbSize/SubHeightC is less than or equal to MinQtSizeC
- (c) mttDepth is not equal to 0
- (d) treeType is equal to DUAL_TREE_CHROMA and (cbSize/SubWidthC) is less than or equal to 4
- (e) treeType is equal to DUAL_TREE_CHROMA and modeType is equal to MODE_TYPE_INTRA Otherwise, the allowSplitQt can be set equal to TRUE. Thus, QT splitting can be allowed.

In an embodiment, a unit of the minimum allowed chroma QT leaf node size, e.g., MinQtSizeC, is in chroma samples.

According to aspects of the disclosure, partition information from a coded video bitstream can be decoded. The partition information can indicate that separate coding tree structures can be used to partition chroma component(s) (e.g., chroma CTB (s)) and a corresponding luma component (e.g., a luma CTB), for example, in a CTU. The partition information can indicate that a dual tree is used and a chroma coding tree structure (e.g., indicated by DUAL_TREE_CHROMA) in the dual tree can be applied to a chroma block, for example, in the CTU. Thus, in an example, treeType is equal to DUAL_TREE_CHROMA. The partition information can further indicate the block size (e.g., cbSize) of the chroma block in luma samples, the chroma vertical subsampling factor (e.g., SubHeightC), and the minimum allowed chroma quaternary tree (QT) leaf node size (e.g., MinQtSizeC). Whether a QT split is disallowed for the chroma block can be determined based at least on the block size of the chroma block in luma samples, the chroma vertical subsampling factor, and the minimum allowed chroma QT leaf node size. In response to the QT split being disallowed for the chroma block, whether at least one of a binary tree split and a ternary tree split is disallowed for the chroma block can be determined.

In an embodiment, the partition information can further indicate that the minimum allowed chroma QT leaf node size (e.g., MinQtSizeC) is in chroma samples. The QT split can be determined to be disallowed for the chroma block when the block size of the chroma block in luma samples is divided by the chroma vertical subsampling factor is less than or equal to the minimum allowed chroma QT leaf node size in chroma samples (e.g., cbSize/SubHeightC is less than or equal to MinQtSizeC in chroma samples).

In an example, the block size of the chroma block in luma samples divided by the chroma vertical subsampling factor is the height of the chroma block in chroma samples. In response to the height of the chroma block in chroma samples being less than or equal to the minimum allowed chroma QT leaf node size in chroma samples (e.g., cbSize/SubHeightC is less than or equal to MinQtSizeC in chroma samples), QT splitting or the QT split for the chroma block can be disallowed. Thus, in an example, the modified condition (b') is used in the allowed quad split process.

Other conditions (e.g., one or more of the conditions (a) and (c)-(e)) can further be checked to determine whether the QT split can be disallowed or allowed. In an embodiment, the partition information can further indicate one or more of the chroma horizontal subsampling factor (e.g., SubWidthC), a MTT depth (e.g., mttDepth) indicating whether the chroma block is a MTT node from a MTT split, and a prediction mode type (e.g., modeType) for the chroma block. Whether the QT split is disallowed for the chroma block can be determined based on the block size of the chroma block in luma samples, the chroma vertical subsampling factor, the minimum allowed chroma QT leaf node size in chroma samples, and one or more of the chroma horizontal subsampling factor, the MTT depth, and the prediction mode type.

In an example, in response to the height of the chroma block in chroma samples, for example the block size of the chroma block in luma samples being divided by the chroma vertical subsampling factor, being larger than the minimum allowed chroma QT leaf node size in chroma samples, one or more of the other conditions can further be checked in the allowed quad split process. Whether the QT split is disallowed for the chroma block can be determined based on one or more of the block size of the chroma block in luma samples, the chroma horizontal subsampling factor, the MTT depth, and the prediction mode type.

In an example, the chroma coding tree structure (e.g., indicated by DUAL_TREE_CHROMA or treeType being equal to DUAL_TREE_CHROMA) in the dual tree is applied to the chroma block and the height of the chroma block in chroma samples is determined to be larger than the minimum allowed chroma QT leaf node size in chroma samples. Accordingly, whether the QT split is disallowed for the chroma block can further be determined based on the block size of the chroma block in luma samples, the chroma horizontal subsampling factor, the MTT depth, and the prediction mode type. For example, the QT split is disallowed for the chroma block (e.g., allowSplitQt is set equal to FALSE) if at least one of following conditions is true: (c) the MTT depth is not equal to 0 (e.g., indicating that the chroma block is the MTT node), (d') a width (e.g., cbSize/SubWidthC) of the chroma block in chroma samples is less than or equal to 4, and (e') the prediction mode type (e.g., modeType) is MODE_TYPE_INTRA indicating that the intra prediction mode (or the intra mode) and the IBC mode are allowed. The QT split can be determined to be allowed when the conditions (c) and (d')-(e') are false and the height of the chroma block in chroma samples is larger than the minimum allowed chroma QT leaf node size in chroma samples. The conditions (d')-(e') and the treeType being equal to DUAL_TREE_CHROMA correspond to the conditions (d)-(e), respectively.

In general, partition size related variables, such as used in the single tree (e.g., SINGLE_TREE for a luma component and chroma component(s) (optional)), a luma coding tree structure (e.g., the dual tree for the luma component or DUAL_TREE_LUMA), and/or a chroma coding tree structure (e.g., the dual tree for the chroma component(s) or DUAL_TREE_CHROMA) can be specified using luma samples or chroma samples and it may not be clear which of luma samples and chroma samples is used to specify the partition size related variables. It can be advantageous to specify whether chroma partition size related variables have a unit of luma samples or a unit of chroma samples.

In an embodiment, the unit of luma samples can be used to describe chroma block size or chroma partition size related variables, for example, used in a chroma coding tree structure (e.g., DUAL_TREE_CHROMA). For example, the minimum allowed chroma QT leaf node size (e.g. MinQtSizeC) can be described in luma samples. Corresponding block sizes in chroma samples can be derived according to the chroma subsampling ratios (e.g., SubWidthC and SubHeightC) in Table 1.

For example, when the chroma format is 4:2:2, the variable MinQtSizeC (or the minimum allowed chroma QT leaf node size) in luma samples corresponds to MinQtSizeC/SubWidthC (or MinQtSizeC/2) in chroma samples since SubWidthC is 2. Thus, when the variable MinQtSizeC in luma samples is 16 (luma samples), the minimum allowed chroma QT leaf node size is 16 (luma samples) or 8 (chroma samples).

When the chroma format is 4:4:4, the variable MinQtSizeC in luma samples corresponds to MinQtSizeC/SubWidthC in chroma samples, which is equal to MinQtSizeC in chroma samples since SubWidthC is 1.

In an embodiment, when an intra dual tree is used, the variable mode type (e.g., modeType) can be one or more of MODE_INTRA (indicating that the intra mode can be used), MODE_IBC (indicating that the IBC mode can be used), or MODE_TYPE_INTRA (indicating that the intra and IBC mode can be used). In an example, when the intra dual tree is used, the variable mode type (e.g., modeType) can be any suitable non-inter prediction mode.

A minimum allowed chroma coding block size may be smaller than a minimum allowed luma coding block size. The partition information can indicate the minimum allowed chroma coding block size in luma samples and the minimum allowed luma coding block size in luma samples. The minimum allowed chroma coding block size in luma samples may be smaller than the minimum allowed luma coding block size in luma samples.

The minimum allowed chroma QT leaf node size can be smaller than a minimum allowed luma QT leaf node size. The partition information can indicate the minimum allowed luma QT leaf node size in luma samples. The minimum allowed chroma QT leaf node size in luma samples for which QT splitting of a CTU is allowed can be smaller than the minimum allowed luma QT leaf node size in luma samples (or a minimum luma leaf block size resulting from QT splitting of a CTU).

According to aspects of the disclosure, the chroma partitioning unit sizes, such as the minimum allowed chroma QT leaf node size (e.g., MinQtSizeC), can be described in luma samples. The allowed quad split process for the chroma block as described above can be modified by modifying the condition (b) while other conditions (e.g., the conditions (a) and (c)-(e) remain unchanged. The modified condition (denoted as the condition (b")) can be described as:

(b") treeType is equal to DUAL_TREE_CHROMA and cbSize is less than or equal to MinQtSizeC.

where cbSize is the block size of the chroma block in luma samples and MinQtSizeC is in luma samples.

The inputs of the allowed quad split process can remain the same as described above while derivation of the output (e.g., the variable allowSplitQt) of the allowed quad split process can be updated as below.

If one or more of the following conditions are true, the variable allowSplitQt can be set equal to FALSE, and the QT splitting is not allowed:

(a) treeType is equal to SINGLE_TREE or DUAL_TREE_LUMA and cbSize is less than or equal to MinQtSizeY (b") treeType is equal to DUAL_TREE_CHROMA and cbSize is less than or equal to MinQtSizeC.

(c) mttDepth is not equal to 0

(d) treeType is equal to DUAL_TREE_CHROMA and (cbSize/SubWidthC) is less than or equal to 4

(e) treeType is equal to DUAL_TREE_CHROMA and modeType is equal to MODE_TYPE_INTRA Otherwise, the allowSplitQt can be set equal to TRUE. Thus, QT splitting can be allowed.

According to aspects of the disclosure, partition information can be decoded from a coded video bitstream. The partition information can indicate that a chroma coding tree structure (e.g., DUAL_TREE_CHROMA or treeType is equal to DUAL_TREE_CHROMA) in a dual tree is applied to the chroma block. The partition information can further indicate the block size of the chroma block in luma samples (e.g., cbSize) and the minimum allowed chroma QT leaf node size (e.g., MinQtSizeC) in luma samples. Whether the block size of the chroma block in luma samples is less than or equal to the minimum allowed chroma QT leaf node size in luma samples can be determined. In response to the block size of the chroma block in luma samples being less than or equal to the minimum allowed chroma QT leaf node size in luma samples, the QT split can be determined to be disallowed for the chroma block.

In an example, the partition information can further indicate the MTT depth (e.g., mttDepth) indicating whether the chroma block is a MTT node from a MTT split, the chroma horizontal subsampling factor (e.g., SubWidthC), and the prediction mode type (e.g., modeType) for the chroma block. When the block size of the chroma block in luma samples is larger than the minimum allowed chroma QT leaf node size in luma samples, the QT split can be determined to be disallowed for the chroma block based on at least one of following conditions being true: (c) the MTT depth is not equal to 0 indicating that the chroma block is the MTT node, (d') the block size of the chroma block in luma samples divided by the chroma horizontal subsampling factor is less than or equal to 4 (or cbSize/SubWidthC <4), and (e') the prediction mode type (or modeType) is MODE_TYPE_INTRA indicating that the intra mode and the IBC mode are allowed. In an example, the QT split is determined to be allowed based on the conditions (c), (d'), and (e') being false.

According to aspects of the disclosure, the chroma partitioning unit sizes, such as the minimum allowed chroma QT leaf node size (e.g., MinQtSizeC), can be described in luma samples. The allowed quad split process for the chroma block as described above can be modified by modifying the condition (b) while other conditions (e.g., the conditions (a) and (c)-(e)) remain unchanged. The modified condition (denoted as the condition (b''')) can be described as:
(b''') treeType is equal to DUAL_TREE_CHROMA and cbSize is less than or equal to (MinQtSizeC×SubHeightC/SubWidthC).

The inputs of the allowed quad split process can remain the same as described above while derivation of the output (e.g., the variable allowSplitQt) of the allowed quad split process can be updated as below.

If one or more of the following conditions are true, the variable allowSplitQt can be set to be equal to FALSE, and the QT splitting is not allowed:
(a) treeType is equal to SINGLE_TREE or DUAL_TREE_LUMA and cbSize is less than or equal to MinQtSizeY
(b''') treeType is equal to DUAL_TREE_CHROMA and cbSize is less than or equal to (MinQtSizeC× SubHeightC/SubWidthC).
(c) mttDepth is not equal to 0
(d) treeType is equal to DUAL_TREE_CHROMA and (cbSize/SubWidthC) is less than or equal to 4
(e) treeType is equal to DUAL_TREE_CHROMA and modeType is equal to MODE_TYPE_INTRA Otherwise, the allowSplitQt can be set equal to TRUE. Thus, QT splitting can be allowed.

The above modification including the condition (b''') can be described below. As described above, in an embodiment, the partition information from the coded video bitstream can be decoded. The partition information can indicate that the chroma coding tree structure (e.g., indicated by DUAL_TREE_CHROMA) in the dual tree can be applied to the chroma block. The partition information can further indicate the block size (e.g., cbSize) of the chroma block in luma samples, the chroma vertical subsampling factor (e.g., SubHeightC), and the minimum allowed chroma quaternary tree (QT) leaf node size (e.g., MinQtSizeC). Whether the QT split is disallowed for the chroma block can be determined based at least on the block size of the chroma block in luma samples, the chroma vertical subsampling factor, and the minimum allowed chroma QT leaf node size. In response to the QT split being disallowed for the chroma block, whether at least one of a binary tree split and a ternary tree split is disallowed for the chroma block can be determined. In an example, the partition information further indicates the chroma horizontal subsampling factor (e.g., SubWidthC) and indicates that the minimum allowed chroma QT leaf node size (e.g., MinQtSizeC) is in luma samples. Thus, whether the QT split is disallowed for the chroma block can be determined based at least on the block size of the chroma block in luma samples, the chroma vertical subsampling factor, the chroma horizontal subsampling factor, and the minimum allowed chroma QT leaf node size in luma samples.

In an embodiment, a parameter that is equal to the minimum allowed chroma QT leaf node size (e.g., MinQtSizeC) in luma samples multiplied by the chroma vertical subsampling factor (e.g., SubHeightC) and divided by the chroma horizontal subsampling factor (e.g., SubWidthC) can be determined. Thus, the parameter is equal to MinQtSizeC×SubHeightC/SubWidthC. Further, the QT split can be determined to be disallowed for the chroma block when the block size of the chroma block in luma samples (e.g., cbSize) is less than or equal to the parameter, as described above.

In an example, the partition information can further indicate the MTT depth (e.g., mttDepth) that indicates whether the chroma block is a MTT node from the MTT split and a prediction mode type (e.g., modeType) for the chroma block. Thus, whether the QT split is disallowed for the chroma block can be determined further based on the MTT depth and the prediction mode type. For example, the QT split can be determined to be disallowed for the chroma block if one of following conditions is true: (b'''') the block size of the chroma block in luma samples (e.g., cbSize) is less than or equal to the minimum allowed chroma QT leaf node size in luma samples multiplied by the chroma vertical subsampling factor and divided by the chroma horizontal subsampling factor (or if cbSize ≤MinQtSizeC×SubHeightC/SubWidthC) (c) the MTT depth (e.g., mttDepth) is not equal to 0 indicating that the chroma block is the MTT node, (d') the block size of the chroma block in luma samples divided by the chroma horizontal subsampling factor is less than or equal to 4 (or cbSize/SubWidthC ≤4), and (e') the prediction mode type (or modeType) is MODE_TYPE_INTRA indicating that the intra prediction mode and the IBC mode can be used. The QT split can be determined to be allowed when the conditions (b'''), (c), (d'), and (e') are false. The condition (b''') and the treeType being equal to DUAL_TREE_CHROMA corresponds to the condition (b'''). As described above, the conditions (d')-(e') and the treeType being equal to DUAL_TREE_CHROMA correspond to the conditions (d)-(e), respectively. Accordingly, the QT split can be determined to be allowed when the conditions (b'''), (c), (d), and (e) are false.

The minimum chroma coding block size can be signaled separately from the minimum allowed luma coding block size. The minimum chroma coding block size in luma samples can be signaled separately from the minimum allowed luma coding block size in luma samples.

In some examples, a minimum chroma coding block size related variable (e.g., MinCbLog2SizeC) is used, such as in VVC. However, a method to derive the minimum chroma coding block size may not be defined.

In an embodiment, the coded video bitstream includes a chroma syntax element indicating the minimum allowed chroma coding block size in luma samples and a luma syntax element indicating the minimum allowed luma coding block size in luma sample.

When an intra dual tree is used, a syntax element (e.g., the chroma syntax element, log2_min_chroma_coding_block_size_minus2) can be signaled, for example, in the coded video bitstream to indicate the minimum chroma coding block size in luma samples. A different syntax element (e.g., the luma syntax element) can be signaled to indicate the minimum allowed luma coding block size in luma samples. The minimum chroma coding block size in luma samples can be different from the minimum allowed luma coding block size in luma samples. The minimum chroma coding block size (e.g., MinCbSizeC), for example, in luma samples can be calculated as following:

$$\text{Min}Cb\,\text{Log2Size}C = \text{log2min\_chroma\_coding\_block\_size\_minus2} + 2 \qquad (39)$$

$$\text{Min}Cb\text{Size}C = 1 << \text{Min}Cb\,\text{Log2Size}C \qquad (40)$$

In an example, a syntax table may be modified as shown in Table 6 (FIG. 26) to illustrate the syntax element (e.g., log2_min_chroma_coding_block_size_minus2), as indicated by a box (2601).

The corresponding semantics may be described as below: log2_min_chroma_coding_block_size_minus2 plus 2 can specify the minimum chroma coding block size in luma samples. A value range of log2_min_chroma_coding_block_size_minus2 can be in a range of 0 to log2_ctu_size_minus5+3, inclusive. The variables MinCbLog2SizeC and MinCbSizeC can be derived using Eqs. 39-40.

The minimum chroma coding block size in luma samples (or the minimum allowed chroma coding block size in luma samples) can be derived from the minimum luma coding block size in luma samples (or the minimum allowed luma coding block size in luma samples). In an example, MinCbLog2SizeC may be derived using the following equation:

$$\text{MinCbLog2SizeC} = \text{MinCbLog2SizeY} \quad (41)$$

In some embodiments, there is a conforming constraint that MinQtLog2SizeIntraC is not smaller than max(2, MinCbLog2SizeY) or max(2, MinCbLog2SizeC).

Figure 27:
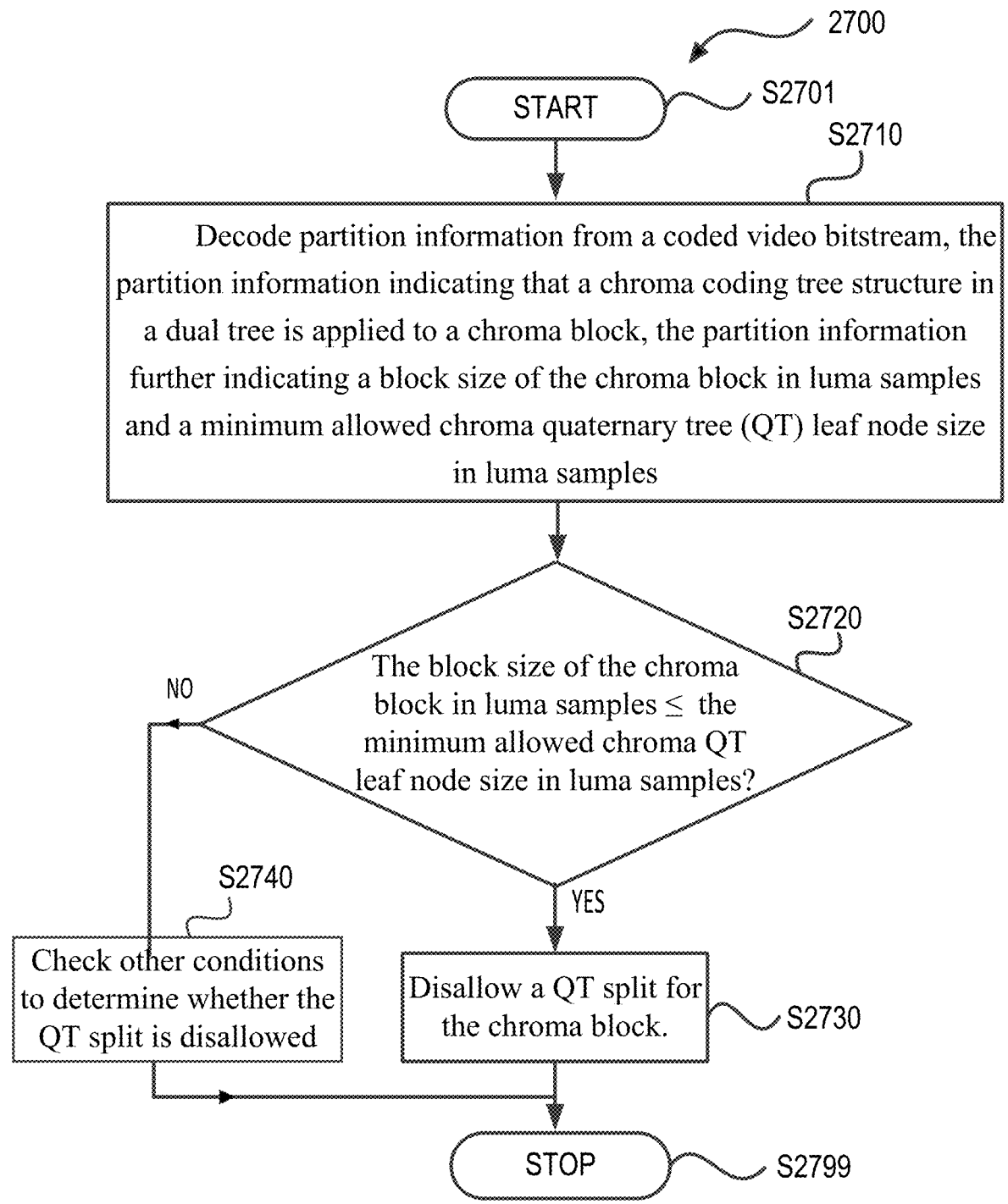
FIG. 27 shows a flow chart outlining a process (2700) according to an embodiment of the disclosure.

FIG. 27 shows a flow chart outlining a process (2700) according to an embodiment of the disclosure. The process (2700) can be used to reconstruct a block (e.g., a CB) in a picture of a coded video sequence. The process (2700) can be used in the reconstruction of the block so to generate a prediction block for the block under reconstruction. The term block may be interpreted as a prediction block, a CB, a CU, or the like. In various embodiments, the process (2700) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (2700) is implemented in software instructions, thus when the processing circuitry executes the software instructions, the processing circuitry performs the process (2700). The process starts at (S2701) and proceeds to (S2710). In an example, the block is a chroma block, such as a chroma CB.

At (S2710), partition information can be decoded from a coded video bitstream. The partition information can indicate that a chroma coding tree structure in a dual tree (e.g., treeType is DUAL_TREE_CHROMA) is applied to the chroma block. The partition information can further indicate a block size (e.g., cbSize) of the chroma block in luma samples and a minimum allowed chroma QT leaf node size (e.g., MinQtSizeC) in luma samples.

At (S2720), whether the block size of the chroma block in luma samples is less than or equal to the minimum allowed chroma QT leaf node size in luma samples can be determined. When the block size of the chroma block in luma samples is determined to be less than or equal to the minimum allowed chroma QT leaf node size in luma samples, the process (2700) proceeds to (S2730). Otherwise, the process (2700) proceeds to (S2740).

At (S2730), a QT split can be determined to be disallowed for the chroma block. The process (2700) proceeds to (S2799), and terminates.

At (S2740), one or more other conditions can be checked to determine whether the QT split is disallowed. The other conditions can include: the MTT depth indicates that the chroma block is the MTT node, the block size of the chroma block in luma samples divided by the chroma horizontal subsampling factor is less than or equal to 4 (or cbSize/SubWidthC ≤4), and/or the prediction mode type (or mode-Type) is MODE_TYPE_INTRA indicating that the intra prediction mode and the IBC mode are allowed. The QT split can be determined to be disallowed for the chroma block (e.g., allowSplitQt is set equal to FALSE) if at least one of the one or more other conditions is true. The QT split can be determined to be allowed when the other conditions are false and the height of the chroma block in chroma samples is larger than the minimum allowed chroma QT leaf node size in chroma samples. The process (2700) proceeds to (S2799), and terminates.

The process (2700) can be suitably adapted. Step(s) in the process (2700) can be modified and/or omitted. Additional step(s) can be added. Any suitable order of implementation can be used.

Figure 28:
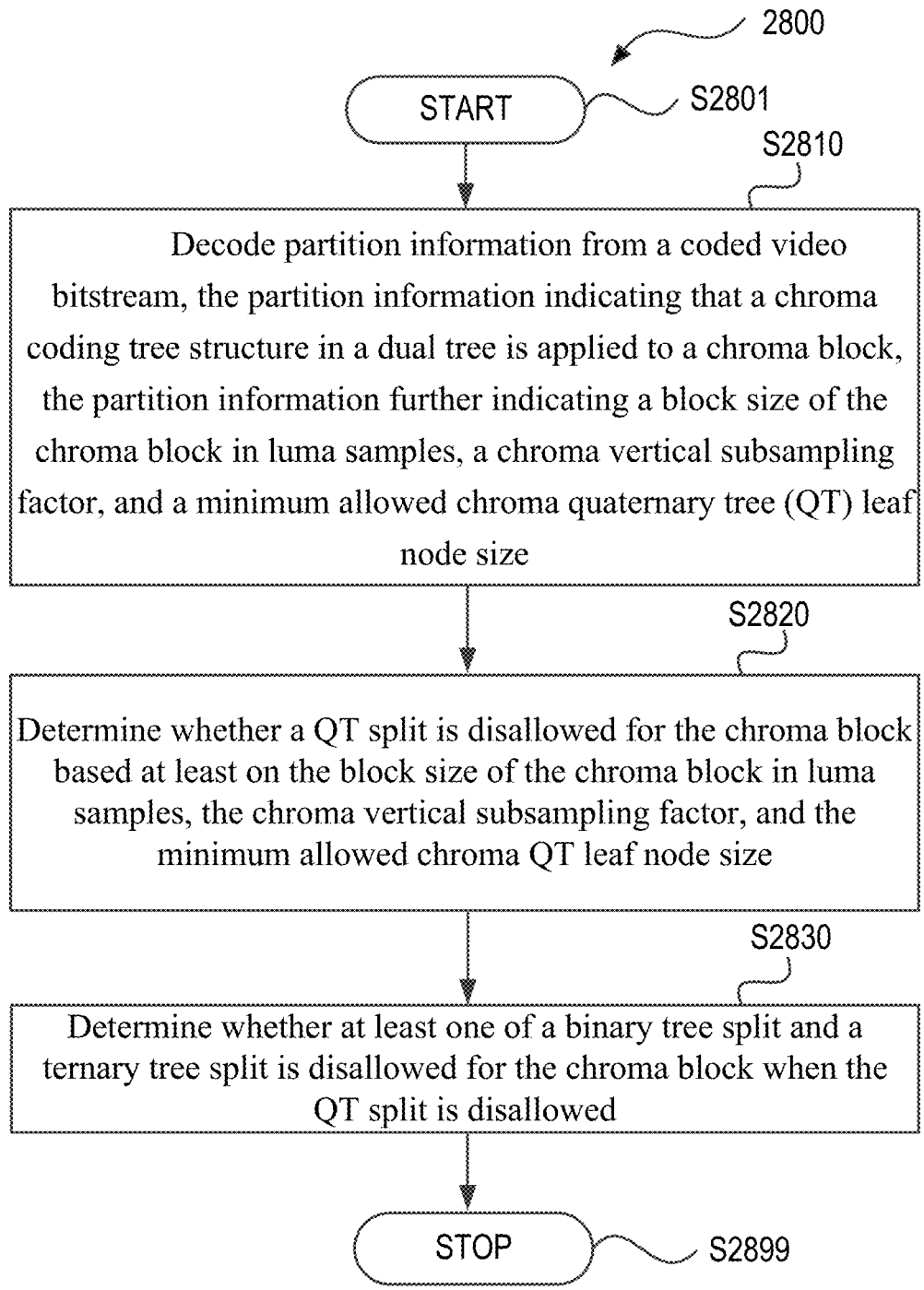
FIG. 28 shows a flow chart outlining a process (2800) according to an embodiment of the disclosure.

FIG. 28 shows a flow chart outlining a process (2800) according to an embodiment of the disclosure. The process (2800) can be used to reconstruct a block (e.g., a CB) in a picture of a coded video sequence. The process (2800) can be used in the reconstruction of the block so to generate a prediction block for the block under reconstruction. The term block may be interpreted as a prediction block, a CB, a CU, or the like. In various embodiments, the process (2800) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (2800) is implemented in software instructions, thus when the processing circuitry executes the software instructions, the processing circuitry performs the process (2800). The process starts at (S2801) and proceeds to (S2810). In an example, the block is a chroma block, such as a chroma CB.

At (S2810), partition information can be decoded from a coded video bitstream. The partition information can indicate that a chroma coding tree structure in a dual tree (e.g., treeType is DUAL_TREE_CHROMA) is applied to the chroma block. The partition information can further indicate a block size (e.g., cbSize) of the chroma block in luma samples, a chroma vertical subsampling factor (e.g., SubHeightC), and a minimum allowed chroma QT leaf node size (e.g., MinQtSizeC).

At (S2820), whether a QT split is disallowed for the chroma block can be determined based at least on the block size of the chroma block in luma samples, the chroma vertical subsampling factor, and the minimum allowed chroma QT leaf node size, as described above.

At (S2830), when the QT split is determined to be disallowed, whether at least one of a binary tree split and a ternary tree split is disallowed for the chroma block can be determined. The process (2800) proceeds to (S2899), and terminates.

The process (2800) can be suitably adapted. Step(s) in the process (2800) can be modified and/or omitted. Additional step(s) can be added. Any suitable order of implementation can be used.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media.

For example, FIG. 30 shows a computer system (2900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 29:
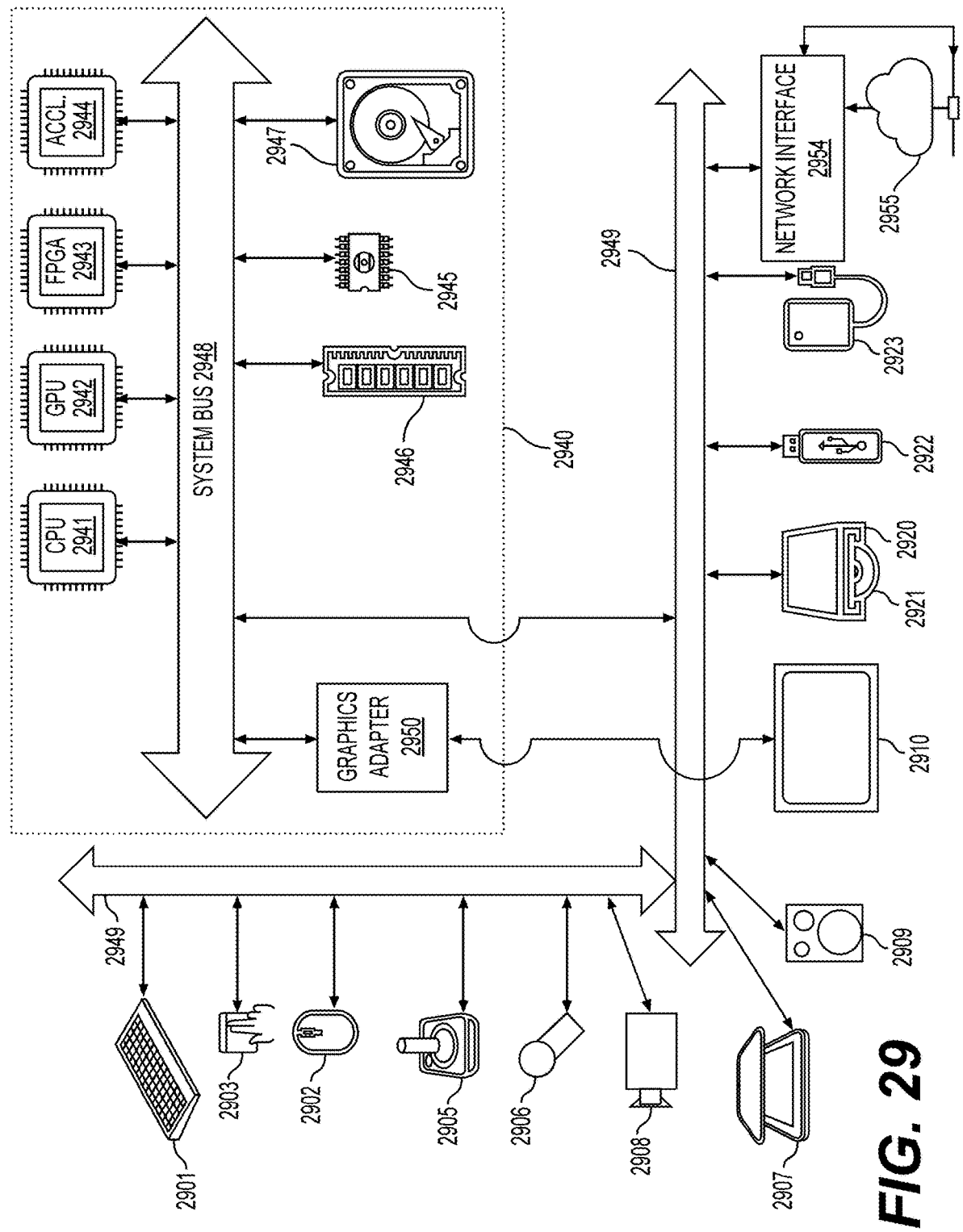
FIG. 29 is a schematic illustration of a computer system in accordance with an embodiment.

The components shown in FIG. 29 for computer system (2900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2900).

Computer system (2900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2901), mouse (2902), trackpad (2903), touch screen (2910), data-glove (not shown), joystick (2905), microphone (2906), scanner (2907), camera (2908).

Computer system (2900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2910), data-glove (not shown), or joystick (2905), but there can also be tactile feedback devices that do not serve as input devices), audio output devices (such as: speakers (2909), headphones (not depicted)), visual output devices (such as screens (2910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2900) can also include human accessible storage devices and their associated media such as optical media including CD/DVD ROM/RW (2920) with CD/DVD or the like media (2921), thumb-drive (2922), removable hard drive or solid state drive (2923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2900) can also include an interface (2954) to one or more communication networks (2955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4 G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2949) (such as, for example USB ports of the computer system (2900)); others are commonly integrated into the core of the computer system (2900) by attachment to a system bus as described below (for example Ethernet interface into a PC computer system or cellular network interface into a smartphone computer system). Using any of these networks, computer system (2900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2940) of the computer system (2900).

The core (2940) can include one or more Central Processing Units (CPU) (2941), Graphics Processing Units (GPU) (2942), specialized programmable processing units in the form of Field Programmable Gate Areas (FPGA) (2943), hardware accelerators for certain tasks (2944), graphics adapter (2950), and so forth. These devices, along with Read-only memory (ROM) (2945), Random-access memory (2946), internal mass storage such as internal non-user accessible hard drives, SSDs, and the like (2947), may be connected through a system bus (2948). In some computer systems, the system bus (2948) can be accessible in the form of one or more physical plugs to enable extensions by additional CPUs, GPU, and the like. The peripheral devices can be attached either directly to the core's system bus (2948), or through a peripheral bus (2949). In an example, a display (2910) can be connected to the graphics adapter (2950). Architectures for a peripheral bus include PCI, USB, and the like.

CPUs (2941), GPUs (2942), FPGAs (2943), and accelerators (2944) can execute certain instructions that, in combination, can make up the aforementioned computer code. That computer code can be stored in ROM (2945) or RAM (2946). Transitional data can be also be stored in RAM (2946), whereas permanent data can be stored for example, in the internal mass storage (2947). Fast storage and retrieve to any of the memory devices can be enabled through the use of cache memory, that can be closely associated with one or more CPU (2941), GPU (2942), mass storage (2947), ROM (2945), RAM (2946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2900), and specifically the core (2940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2940) that are of non-transitory nature, such as core-internal mass storage (2947) or ROM (2945). The software implementing various embodiments of the present disclosure can be stored in such devices and executed by core (2940). A computer-readable medium can include one or more memory devices or chips, according to particular needs. The software can cause the core (2940) and specifically the processors therein (including CPU, GPU, FPGA, and the like) to execute particular processes or particular parts of particular processes described herein, including defining data structures stored in RAM (2946) and modifying such data structures according to the processes defined by the software. In addition or as an alternative, the computer system can provide functionality as a result of logic hardwired or otherwise embodied in a circuit (for example: accelerator (2944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
MPM: most probable mode
WAIP: Wide-Angle Intra Prediction
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SDR: standard dynamic range
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
PDPC: Position Dependent Prediction Combination
ISP: Intra Sub-Partitions
SPS: Sequence Parameter Setting While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video encoding in an encoder, comprising:
   determining whether a block size cbSize of a chroma block in luma samples is less than or equal to a minimum allowed chroma quaternary tree (QT) leaf node size MinQtSizeC in luma samples such that cbSize <=MinQtSizeC;
   in response to the block size cbSize of the chroma block in luma samples being less than or equal to the minimum allowed chroma QT leaf node size MinQtSizeC in luma samples, determining that a QT split is disallowed for the chroma block; and
   generating partition information indicating that a chroma coding tree structure in a dual tree is applied to the chroma block, the partition information further indicating the block size cbSize of the chroma block in luma samples and the minimum allowed chroma QT leaf node size MinQtSizeC in luma samples, the MinQtSizeC indicating a minimum allowed chroma block size for QT splitting.

2. The method of claim 1, wherein
   the partition information further indicates a multi-type tree (MTT) depth indicating whether the chroma block is a MTT node from a MTT split, a chroma horizontal subsampling factor, and a prediction mode type for the chroma block; and
   in response to the block size cbSize of the chroma block in luma samples being larger than the minimum allowed chroma QT leaf node size MinQtSizeC in luma samples, determining that the QT split is disallowed for the chroma block based on at least one of (i) the MTT depth indicating that the chroma block is the MTT node, (ii) the block size cbSize of the chroma block in luma samples divided by the chroma horizontal subsampling factor being less than or equal to 4, and (iii) the prediction mode type indicating that an intra prediction mode and an intra block copy (IBC) mode are allowed.

3. The method of claim 1, wherein
   the partition information further indicates a minimum allowed chroma coding block size in luma samples and a minimum allowed luma coding block size in luma samples; and the minimum allowed chroma coding block size in luma samples is less than the minimum allowed luma coding block size in luma samples.

4. The method of claim 3, further comprising:
generating a chroma syntax element indicating the minimum allowed chroma coding block size in luma samples and a luma syntax element indicating the minimum allowed luma coding block size in luma samples.

5. The method of claim 3, wherein
the minimum allowed chroma coding block size in luma samples is derived based on the minimum allowed luma coding block size in luma samples.

6. The method of claim 1, wherein
the partition information further indicates a minimum allowed luma QT leaf node size MinQtSizeY in luma samples, and
the MinQtSizeC in luma samples is less than the MinQtSizeY in luma samples.

7. A method for video encoding in an encoder, comprising:
determining a parameter that is equal to a minimum allowed chroma quaternary tree (QT) leaf node size in luma samples multiplied by a chroma vertical subsampling factor and divided by a chroma horizontal subsampling factor;
determining whether a QT split is disallowed for a chroma block in response to a block size of the chroma block in luma samples being less than or equal to the parameter;
in response to the QT split being disallowed for the chroma block, determining whether at least one of a binary tree split and a ternary tree split is disallowed for the chroma block; and
generating partition information indicating that a chroma coding tree structure in a dual tree is applied to the chroma block, the partition information further indicating the block size of the chroma block in luma samples, the chroma vertical subsampling factor, and the minimum allowed chroma QT leaf node size.

8. The method of claim 7, wherein
the minimum allowed chroma QT leaf node size is in luma samples,
the partition information further indicates the chroma horizontal subsampling factor, and
the determining whether the QT split is disallowed includes determining whether the QT split is disallowed for the chroma block based at least on the block size of the chroma block in luma samples, the chroma vertical subsampling factor, the chroma horizontal subsampling factor, and the minimum allowed chroma QT leaf node size in luma samples.

9. The method of claim 8, wherein
the partition information further indicates a multi-type tree (MTT) depth indicating whether the chroma block is a MTT node from a MTT split and a prediction mode type for the chroma block; and
the determining whether the QT split is disallowed includes determining whether the QT split is disallowed for the chroma block further based on the MTT depth and the prediction mode type.

10. The method of claim 7, wherein
the partition information further indicates a minimum allowed chroma coding block size in luma samples and a minimum allowed luma coding block size in luma samples; and the minimum allowed chroma coding block size in luma samples is less than the minimum allowed luma coding block size in luma samples.

11. The method of claim 10, further comprising:
generating a chroma syntax element indicating the minimum allowed chroma coding block size in luma samples and a luma syntax element indicating the minimum allowed luma coding block size in luma samples.

12. The method of claim 10, wherein
the minimum allowed chroma coding block size in luma samples is derived based on the minimum allowed luma coding block size in luma samples.

13. The method of claim 7, wherein
the partition information further includes a minimum allowed luma QT leaf node size in luma samples; and
the minimum allowed chroma QT leaf node size in luma samples is less than the minimum allowed luma QT leaf node size in luma samples.

14. The method of claim 7, wherein
the minimum allowed chroma QT leaf node size is in chroma samples; and
the determining whether the QT split is disallowed includes determining that the QT split is disallowed for the chroma block based on the block size of the chroma block in luma samples divided by the chroma vertical subsampling factor being less than or equal to the minimum allowed chroma QT leaf node size in chroma samples.

15. The method of claim 14, wherein
the partition information further indicates the chroma horizontal subsampling factor, a MTT depth indicating whether the chroma block is a MTT node from a MTT split, and a prediction mode type for the chroma block; and
in response to the block size of the chroma block in luma samples divided by the chroma vertical subsampling factor being larger than the minimum allowed chroma QT leaf node size in chroma samples, the method further includes:
determining whether the QT split is disallowed for the chroma block based on the block size of the chroma block in luma samples, the chroma horizontal subsampling factor, the MTT depth, and the prediction mode type.

16. An apparatus for video encoding, comprising processing circuitry configured to:
determine whether a block size cbSize of a chroma block in luma samples is less than or equal to a minimum allowed chroma quaternary tree (QT) leaf node size MinQtSizeC in luma samples such that cbSize<=MinQtSizeC;
in response to the block size cbSize of the chroma block in luma samples being less than or equal to the minimum allowed chroma QT leaf node size MinQtSizeC in luma samples, determine that a QT split is disallowed for the chroma block; and
generate partition information indicating that a chroma coding tree structure in a dual tree is applied to the chroma block, the partition information further indicating the block size cbSize of the chroma block in luma samples and the minimum allowed chroma QT leaf node size MinQtSizeC in luma samples, the MinQtSizeC indicating a minimum allowed chroma block size for QT splitting.

17. The apparatus of claim 16, wherein the partition information further indicates a multi-type tree (MTT) depth indicating whether the chroma block is a MTT node from a MTT split, a chroma horizontal subsampling factor, and a prediction mode type for the chroma block; and in response to the block size cbSize of the chroma block in luma samples being larger than the minimum allowed chroma QT leaf node size MinQtSizeC in luma samples, the processing circuitry is configured to determine that the QT split is disallowed for the chroma block based on at least one of (i) the MTT depth indicating that the chroma block is the MTT node, (ii) the block size cbSize of the chroma block in luma samples divided by the chroma horizontal sub sampling factor being less than or equal to 4, and (iii) the prediction mode type indicating that an intra prediction mode and an intra block copy (IBC) mode are allowed.

18. The apparatus of claim 16, wherein the partition information further indicates a minimum allowed chroma coding block size in luma samples and a minimum allowed luma coding block size in luma samples; and the minimum allowed chroma coding block size in luma samples is less than the minimum allowed luma coding block size in luma samples.

19. The apparatus of claim 18, wherein the processing circuitry is configured to:

generate a chroma syntax element indicating the minimum allowed chroma coding block size in luma samples and a luma syntax element indicating the minimum allowed luma coding block size in luma samples.

20. The apparatus of claim 18, wherein the minimum allowed chroma coding block size in luma samples is derived based on the minimum allowed luma coding block size in luma samples.

* * * * *